United States Patent [19]
Slattery et al.

[11] Patent Number: 6,148,082
[45] Date of Patent: Nov. 14, 2000

[54] SCRAMBLING AND DESCRAMBLING CONTROL WORD CONTROL IN A REMULTIPLEXER FOR VIDEO BEARING TRANSPORT STREAMS

[75] Inventors: William Slattery, Los Gatos; Regis Gratacap, Mill Valley, both of Calif.

[73] Assignee: SkyStream Corporation, Mountain View, Calif.

[21] Appl. No.: 09/007,199

[22] Filed: Jan. 14, 1998

[51] Int. Cl.$^7$ ................................................. H04N 7/167
[52] U.S. Cl. ...................... 380/212; 380/239; 370/474; 348/385; 713/160
[58] Field of Search ..................................... 370/426, 474, 370/394, 412, 521; 380/212, 217, 239, 269; 709/246, 247; 348/385, 465; 713/160, 162

[56] References Cited

U.S. PATENT DOCUMENTS

| | | | |
|---|---|---|---|
| 5,420,866 | 5/1995 | Wasilewski | 370/426 |
| 5,473,601 | 12/1995 | Rosen et al. | 370/319 |
| 5,475,754 | 12/1995 | Bridgwater et al. | 380/212 |
| 5,517,250 | 5/1996 | Hoogenboom et al. | 348/845.1 |
| 5,521,979 | 5/1996 | Deiss | 380/212 |
| 5,566,208 | 10/1996 | Balakrishnan | 375/240 |
| 5,579,317 | 11/1996 | Pang et al. | 370/392 |

*Primary Examiner*—Gilberto Barron, Jr.
*Attorney, Agent, or Firm*—Proskauer Rose LLP

[57] ABSTRACT

A method and system are provided for remultiplexing program bearing data. The remultiplexing method and system are applicable to MPEG-2 compliant transport streams carrying video programs. A descriptor based system is used for scheduling the timely output of transport packets wherein each descriptor records a dispatch time as well as a receipt time for each transport packet. The receipt time is used for estimating program clock reference adjustments, but final program clock reference adjustment is performed in hardware in relation to the precise output timing of each transport packets. A descriptor and transport packet caching technique is used for decoupling the synchronous receipt and transmission of transport packets from any asynchronous processing performed thereon. The descriptors can also be used for managing scrambling and descrambling control words (encryption and decryption keys). Remultiplexing functions may be distributed across a network. The remultiplexer can furthermore optimize the bandwidth of transport streams by replacing null transport packets with transport packet data to be inserted into the output transport stream. Program data transmitted via asynchronous communication links is re-timed and assistance is provided for outputting program data on such asynchronous communication links to reduce a variation in end-to-end delay incurred by the program data. Remultiplexing and program specific information can be seamlessly dynamically varied without stopping, or introducing a discontinuity in, the flow of outputted transport packets. A technique is also provided for locking multiple internal reference clock generators.

48 Claims, 3 Drawing Sheets

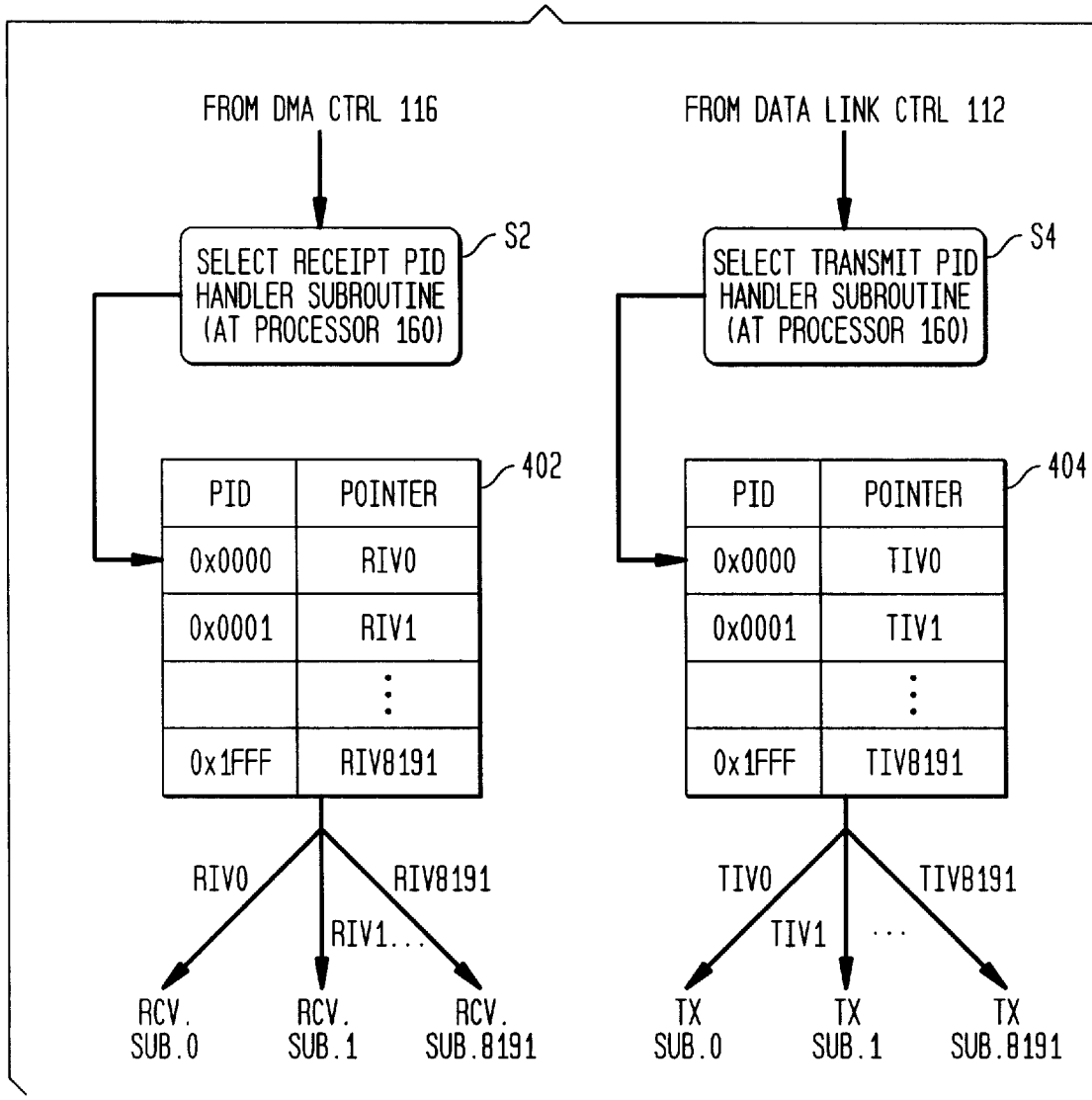

SCRAMBLING AND DESCRAMBLING CONTROL WORD CONTROL IN A REMULTIPLEXER FOR VIDEO BEARING TRANSPORT STREAMS

RELATED APPLICATIONS

The subject matter of this application is related to the subject matter of the following patent applications, all of which are commonly assigned to the same assignee as is this application:

(1) U.S. patent application Ser. No. 09/007,212, entitled "Receipt and Dispatch Timing of Transport Packets in a Video Program Bearing Stream Remultiplexer," filed on even date herewith for Regis Gratacap and William Slattery;

(2) U.S. patent application Ser. No. 09/007,334, entitled "Dynamic Video Program Bearing Stream Remultiplexer," filed on even data herewith for Regis Gratacap;

(3) U.S. patent application Ser. No. 09/007,203, entitled "Re-timing of Video Program Bearing Streams Transmitted by an Asynchronous Communication Link," filed on even date herewith for Regis Gratacap;

(4) U.S. patent application Ser. No. 09/007,211, entitled "Bandwidth Optimization of Video Program Bearing Transport Streams," filed on even date herewith for Robert Robinett and Regis Gratacap;

(5) U.S. patent application Ser. No. 09/007,204, entitled "Remultiplexer for Video Program Bearing Transport Streams with Assisted Output Timing for Asynchronous Communication Output," filed on even data herewith for Regis Gratacap;

(6) U.S. patent application Ser. No. 09/007,210, entitled "Network Distributed Remultiplexer for Video Program Bearing Transport Streams," filed on even date herewith for Robert Robinett, Regis Gratacap and William Slattery;

(7) U.S. patent application Ser. No. 09/006,964, entitled "Remultiplexer for Video Program Bearing Transport Streams with Program Clock Reference Time Stamp Adjustment," filed on even date herewith for William Slattery and Regis Gratacap;

(8) U.S. patent application Ser. No. 09/007,198, now U.S. Pat. No. 6,064,676 entitled "Remultiplexer Cache Architecture and Memory Organization for Storing Video Program Bearing Transport Packets and Descriptors," filed on even date herewith for William Slattery and Regis Gratacap; and (9) U.S. patent application Ser. No. 09/006,963, entitled "Reference Time Clock Locking in a Remultiplexer for Video Program Bearing Transport Streams," filed on even date herewith for William Slattery.

The contents of the above-listed patent applications are incorporated herein by reference.

FIELD OF THE INVENTION

The present invention pertains to communication systems. In particular, the invention pertains to selectively multiplexing bit streams containing one or more programs, such as real-time audio-video programs. Program specific and other program related information is adjusted so as to enable identification, extraction and real-time reproduction of the program at the receiving end of the bit streams.

BACKGROUND OF THE INVENTION

Recently, techniques have been proposed for efficiently compressing digital audio-video programs for storage and transmission. See, for example, ISO\IEC IS 13818-1,2,3: Information Technology-Generic Coding of Moving Pictures and Associated Audio Information: Systems, Video and Audio ("MPEG-2"); ISO\IEC IS 11172-1,2,3: Information Technology-Generic Coding of Moving Pictures and Associated Audio for Digital Storage Media at up to about 1.5 Mbits/sec: Systems, Video and Audio ("MPEG-1"); Dolby AC-3; Motion JPEG, etc. Herein, the term program means a collection of related audio-video signals having a common time base and intended for synchronized presentation, as per MPEG-2 parlance.

MPEG-1 and MPEG-2 provide for hierarchically layered streams. That is, an audio-video program is composed of one or more coded bit streams or "elementary streams" ("ES") such as an encoded video ES, and encoded audio ES, a second language encoded audio ES, a closed caption text ES, etc. Each ES, in particular, each of the audio and video ESs, is separately encoded. The encoded ESs are then combined into a systems layer stream such as a program stream "PS" or a transport stream "TS". The purpose of the PS or TS is to enable extraction of the encoded ESs of a program, separation and separate decoding of each ES and synchronized presentation of the decoded ESs. The TS or PS may be encapsulated in an even higher channel layer or storage format which provides for forward error correction.

Elementary Streams

Audio ESs are typically encoded at a constant bit rate, e.g., 384 kbps. Video ESs, on the other hand, are encoded according to MPEG-1 or MPEG-2 at a variable bit rate. This means that the number of bits per compressed/encoded picture varies from picture to picture (which pictures are presented or displayed at a constant rate). Video encoding involves the steps of spatially and temporally encoding the video pictures. Spatial encoding includes discrete cosine transforming, quantizing, (zig-zag) scanning, run length encoding and variable length encoding blocks of luminance and chrominance pixel data. Temporal coding involves estimating the motion of macroblocks (e.g., a 4×4 array of luminance blocks and each chrominance block overlaid thereon) to identify motion vectors, motion compensating the macroblocks to form prediction error macroblocks, spatially encoding the prediction error macroblocks and variable length encoding the motion vectors. Some pictures, called I pictures, are only spatially encoded, whereas other pictures, such as P and B pictures are both spatially and motion compensated encoded (i.e., temporally predicted from other pictures). Encoded I pictures typically have more bits than encoded P pictures and encoded P pictures typically have more bits than encoded B pictures. In any event, even encoded pictures of the same type tend to have different numbers of bits.

MPEG-2 defines a buffer size constraint on encoded video ESs. In particular, a decoder is presumed to have a buffer with a predefined maximum storage capacity. The encoded video ES must not cause the decoder buffer to overflow (and in some cases, must not cause the decoder buffer to underflow). MPEG-2 specifically defines the times at which each picture's compressed data are removed from the decoder buffer in relation to the bit rate of the video ES, the picture display rate and certain picture reordering constraints imposed to enable decoding of predicted pictures (from the reference pictures from which they were predicted). Given such constraints. the number of bits produced in compressing a picture can be adjusted (as frequently as on a macroblock by macroblock basis) to ensure that the video ES does not cause the video ES decoder buffer to underflow or overflow.

Transport Streams

This invention is illustrated herein for TSs. For sake of brevity, the discussion of PSs is omitted. However, those having ordinary skill in the art will appreciate the applicability of certain aspects of this invention to PSs.

The data of each ES is formed into variable length program elementary stream or "PES" packets. PES packets contain data for only a single ES, but may contain data for more than one decoding unit (e.g., may contain more than one compressed picture, more than one compressed audio frame, etc.). In the case of a TS, the PES packets are first divided into a number of payload units and inserted into fixed length (188 byte long) transport packets. Each transport packet may carry payload data of only one type, e.g., PES packet data for only one ES. Each TS is provided with a four byte header that includes a packet identifier or "PID." The PID is analogous to a tag which uniquely indicates the contents of the transport packet. Thus, one PID is assigned to a video ES of a particular program, a second, different PID is assigned to the audio ES of a particular program, etc.

The ESs of each program are encoded in relation to a single encoder system time clock. Likewise, the decoding and synchronized presentation of the ESs are, in turn, synchronized in relation to the same encoder system time clock. Thus, the decoder must be able to recover the original encoder system time clock in order to be able to decode each ES and present each decoded ES in a timely and mutually synchronized fashion. To that end, time stamps of the system time clock, called program clock references or "PCRs," are inserted into the payloads of selected transport packets (specifically, in adaption fields). The decoder extracts the PCRs from the transport packets and uses the PCRs to recover the encoder system time clock. The PES packets may contain decoding time stamps or "DTSs" and/or presentation time stamps or "PTSs". A DTS indicates the time, relative to the recovered encoder system time clock, at which the next decoding unit (i.e., compressed audio frame, compressed video picture, etc.) should be decoded. The PTS indicates the time, relative to the recovered encoder system time clock, at which the next presentation unit (i.e., decompressed audio frame, decompressed picture, etc.) should be presented or displayed.

Unlike the PS, a TS may have transport packets that carry program data for more than one program. Each program may have been encoded at a different encoder in relation to a different encoder system time clock. The TS enables the decoder to recover the specific system time clock of the program which the decoder desires to decode. To that end, the TS must carry separate sets of PCRs, i.e., one set of PCRs for recovering the encoder system time clock of each program.

The TS also carries program specific information or (PSI) in transport packets. PSI is for identifying data of a desired program or other information for assisting in decoding a program. A program association table or "PAT" is provided which is carried in transport packets with the PID 0x0000. The PAT correlates each program number with the PID of the transport packets carrying program definitions for that program. A program definition: (1) indicates which ESs make up the program to which the program definition corresponds, (2) identifies the PIDs for each of those ESs, (3) indicates the PID of the transport packets carrying the PCRs of that program (4) identifies the PIDs of transport packets carrying ES specific entitlement control messages (e.g., descrambling or decryption keys) and other information. Collectively, all program definitions of a TS are referred to as a program mapping table (PMT). Thus, a decoder can extract the PAT data from the transport packets and use the PAT to identify the PID of the transport packets carrying the program definition of a desired program. The decoder can then extract from the transport packets the program definition data of the desired program and identify the PIDs of the transport packets carrying the ES data that makes up the desired program and of the transport packets carrying the PCRs. Using these identified PIDs, the decoder can then extract from the transport packets of the TSs the ES data of the ESs of the desired program and the PCRs of that program. The decoder recovers the encoder system time clock from the PCRs of the desired program and decodes and presents the ES data at times relative to the recovered encoder system time clock.

Other types of information optionally provided in a TS include entitlement control messages (ECMs), entitlement management messages (EMMs), a conditional access table (CAT) and a network information table (NIT) (the CAT and NIT also being types of PSI). ECMs are ES specific messages for controlling the ability of a decoder to interpret the ES to which the ECM pertains. For example, an ES may be scrambled and the descrambling key or control word may be an ECM. The ECMs associated with a particular ES are placed in their own transport packets and are labeled with a unique PID. EMMs, on the other hand, are system wide messages for controlling the ability of a set of decoders (which set is in a system referred to as a "conditional access system") to interpret portions of a TS. EMMs are placed in their own transport packets and are labeled with a PID unique to the conditional accesses system to which the EMMs pertain. A CAT is provided whenever EMMs are present for enabling a decoder to locate the EMMs of the conditional access system of which the decoder is a part (i.e., of the set of decoders of which the decoder is a member). The NIT maintains various network parameters. For example, if multiple TSs are modulated on different carrier frequencies to which a decoder receiver can tune, the NIT may indicate on which carrier frequency (the TS carrying) each program is modulated.

Like the video ES, MPEG-2 requires that the TS be decoded by a decoder having TS buffers of predefined sizes for storing program ES and PSI data. MPEG-2 also defines the rate at which data flows into and out of such buffers. Most importantly, MPEG-2 requires that the TS not overflow or underflow the TS buffers.

To further prevent buffer overflow or underflow, MPEG-2 requires that data transported from an encoder to a decoder experience a constant end-to-end delay, and that the appropriate program and ES bit rate be maintained. In addition, to ensure that ESs are timely decoded and presented, the relative time of arrival of the PCRs in the TS should not vary too much from the relative time indicated by such PCRs. Stated another way, each PCR indicates the time that the system time clock (recovered at the decoder) should have when the last byte containing a portion of the PCR is received. Thus, the time of receipt of successive PCRs should correlate with the times indicated by each PCR.

Remultiplexing

Often it is desired to "remultiplex" TSs. Remultiplexing involves the selective modification of the content of a TS, such as adding transport packets to a TS, deleting transport packets from a TS, rearranging the ordering of transport packets in a TS and/or modifying the data contained in transport packets. For example, sometimes it is desirable to add transport packets containing a first program to a TS that contains other programs. Such an operation involves more steps than simply adding the transport packets of the first program. In the very least, the PSI, such as, the PAT and PMT, must be modified so that it correctly references the contents of the TS. However, the TS must be further modified to maintain the constant end-to-end delay of each program carried therein. Specifically, the bit rate of each program must not change to prevent TS and video decoder buffer underflow and overflow. Furthermore, any temporal misalignment introduced into the PCRs of the TS, for example, as a result of changing the relative spacing/rate of receipt of successive transport packets bearing PCRs of the same program, must be removed.

The prior art has proposed a remultiplexer for MPEG-2 TSs. The proposed remultiplexer is a sophisticated, dedicated piece of hardware that provides complete synchronicity between the point that each inputted to-be-remultiplexed TS is received to the point that the final remultiplexed outputted TS is outputted—a single system time clock controls and synchronizes receipt, buffering, modification, transfer, reassembly and output of transport packets. While such a remultiplexer is capable of remultiplexing TSs, the remultiplexer architecture is complicated and requires a dedicated, uniformly synchronous platform.

It is an object of the present invention to provide a flexible remultiplexing architecture that can, for instance, reside on an arbitrary, possibly asynchronous, platform.

A program encoder is known which compresses the video and audio of a single program and produces a single program bearing TS. As noted above, MPEG-2 imposes very tight constraints on the bit rate of the TS and the number of bits that may be present in the video decoder buffer at any moment of time. It is difficult to encode an ES, in particular a video ES, and ensure that the bit rate remain completely constant from moment to moment. Rather, some overhead bandwidth must be allocated to each program to ensure that ES data is not omitted as a result of the ES encoder producing an unexpected excessive amount of encoded information. On the other hand, the program encoder occasionally does not have any encoded program data to output at a particular transport packet time slot. This may occur because the program encoder has reduced the number of bits to be outputted at that moment to prevent a decoder buffer overflow. Alternatively, this may occur because the program encoder needs an unanticipated longer amount of time to encode the ESs and therefore has no data available at that instant of time. To maintain the bit rate of the TS and prevent a TS decoder buffer underflow, a null transport packet is inserted into the transport packet time slot.

The presence of null transport packets in a to-be-remultiplexed TS is often a constraint that simply must be accepted. It is an object of the present invention to optimize the bandwidth of TSs containing null transport packets.

Sometimes, the TS or ES data is transferred via an asynchronous communication link. It is an object of the present invention to "re-time" such un-timed or asynchronously transferred data. It is also an object of the present invention to minimize jitter in transport packets transmitted from such asynchronous communication links by timing the transmission of such transport packets.

It is also an object of the present invention to enable the user to dynamically change the content remultiplexed into the remultiplexed TS, i.e., in real-time without stopping the flow of transport packets in the outputted remultiplexed TS.

It is a further object of the present invention to distribute the remultiplexing functions over a network. For example, it is an object to place one or more TS or ES sources at arbitrary nodes of an communications network which may be asynchronous (such as an Ethernet LAN) and to place a remultiplexer at another node of such a network.

SUMMARY OF THE INVENTION

These and other objects are achieved according to the present invention. An illustrative application of the invention is the remultiplexing one or more MPEG-2 compliant transport streams (TSs). TSs are bit streams that contain the data of one or more compressed/encoded audio-video programs. Each TS is formed as a sequence of fixed length transport packets. Each compressed program includes data for one or more compressed elementary streams (ESs), such as a digital video signal and/or a digital audio signal. The transport packets also carry program clock references (PCRs) for each program, which are time stamps of an encoder system time clock to which the decoding and presentation of the respective program is synchronized. Each program has a predetermined bit rate and is intended to be decoded at a decoder having a TS buffer and a video decoder buffer of predetermined sizes. Each program is encoded in a fashion so as to prevent overflow and underflow of these buffers. Program specific information (PSI) illustratively is also carried in selected transport packets of the TS for assisting in decoding the TS.

According to one embodiment, a remultiplexer node is provided with one or more adaptors, each adaptor including a cache, a data link control circuit connected to the cache and a direct memory access circuit connected to the cache. The adaptor is a synchronous interface with special features. The data link control circuit has an input port for receiving transport streams and an output port for transmitting transport streams. The direct memory access circuit can be connected to an asynchronous communication link with a varying end-to-end communication delay, such as a bus of the remultiplexer node. Using the asynchronous communication link, the direct memory access circuit can access a memory of the remultiplexer node. The memory can store one or more queues of descriptor storage locations, such as a queue assigned to an input port and a queue assigned to an output port. The memory can also store transport packets in transport packet storage locations to which descriptors stored in such descriptor storage locations of each queue point. Illustratively, the remultiplexer node includes a processor, connected to the bus, for processing transport packets and descriptors.

When an adaptor is used to input transport streams, the data link control circuit allocates to each received transport packet to be retained, an unused descriptor in one of a sequence of descriptor storage locations, of a queue allocated to the input port. The allocated descriptor is in a descriptor storage location of which the cache has obtained control. The data link control circuit stores each retained transport packet at a transport packet storage location of which the cache has obtained control and which is pointed to by the descriptor allocated thereto. The direct memory access circuit obtains control of one or more unused descriptor storage locations of the queue in the memory following a last descriptor storage location of which the cache has already obtained control. The direct memory access circuit also obtains control of transport packet locations in the memory to which such descriptors in the one or more descriptor storage locations point.

When an adaptor is used to output transport packets, the data link control circuit retrieves from the cache each descriptor of a sequence of descriptor storage locations of a queue assigned to the output port. The descriptors are retrieved from the beginning of the sequence in order. The data link control circuit also retrieves from the cache the transport packets stored in transport packet storage locations to which the retrieved descriptors point. The data link control circuit outputs each retrieved transport packet in a unique time slot (i.e., one transport packet per time slot) of a transport stream outputted from the output port. The direct memory access circuit obtains from the memory for storage in the cache, descriptors of the queue assigned to the output port in storage locations following the descriptor storage locations in which a last cached descriptor of the sequence is stored. The direct memory access circuit also obtains each transport packet stored in a transport packet location to which the obtained descriptors point.

According to another embodiment, each descriptor is (also) used to record a receipt time stamp, indicating when a transport packet is received at an input port, or a dispatch time stamp, indicating the time at which a transport packet is to be transmitted from an output port. In the case of transport packets received at an input port, the data link control circuit records a receipt time stamp in the descriptor allocated to each received and retained transport packet indicating a time at which the transport packet was received. The descriptors are maintained in order of receipt in the receipt queue. In the ease of outputting transport packets from an output port, the data link control circuit sequentially retrieves each descriptor from the transmit queue, and the transport packet to which each retrieved descriptor points. At a time corresponding to a dispatch time recorded in each retrieved descriptor, the data link control circuit transmits the retrieved transport packet to which each retrieved descriptor points in a time slot of the outputted transport stream corresponding to the dispatch time recorded in the retrieved descriptor.

Illustratively, the remultiplexer node processor examines each descriptor in the receipt queue, as well as other queues containing descriptors pointing to to-be-outputted transport packets. The processor allocates a descriptor of the transmit queue associated with an output port from which a transport packet pointed to by each examined descriptor is to be transmitted (if any). The processor assigns a dispatch time to the allocated descriptor of the transmit queue, depending on, for example, a receipt time of the transport packet to which the descriptor points and an internal buffer delay between receipt and output of the transport packet. The processor furthermore orders the descriptors of the transmit queue in order of increasing dispatch time.

A unique PCR normalization process is also provided. The processor schedules each transport packet to be outputted in a time slot at a particular dispatch time, corresponding to a predetermined delay in the remultiplexer node. If the scheduled transport packet contains a PCR, the PCR is adjusted based on a drift of the local reference clock(s) relative to the program of the system time clock from which the PCR was generated, if any drift exists. The data link control circuit, that transmits such adjusted PCR bearing transport packets, further adjust each adjusted PCR time stamp based on a difference between the scheduled dispatch time of the transport packet and an actual time at which the time slot occurs relative to an external clock.

Illustratively, if more than one transport packet is to be outputted in the same time slot, each such transport packet is outputted in a separate consecutive time slot. The processor calculates an estimated adjustment for each PCR in a transport packet scheduled to be outputted in a time slot other than the time slot as would be determined using the predetermined delay. The estimated adjustment is based on a difference in output time between the time slot in which the processor has actually scheduled the transport packet bearing the PCR to be outputted and the time slot as determined by the predetermined delay. The processor adjusts the PCRs according to this estimated adjustment.

According to one embodiment, the descriptors are also used for controlling scrambling or descrambling of transport packets. In the case of descrambling, the processor defines a sequence of one or more processing steps to be performed on each transport packet and orders descrambling processing within the sequence. The processor stores control word information associated with contents of the transport packet in the control word information storage location of the allocated descriptors. The data link control circuit allocates descriptors to each received, retained transport packet, which descriptors each include one or more processing indications and a storage location for control word information. The data link control circuit sets one or more of the processing indications of the allocated descriptor to indicate that the next step of processing of the sequence may be performed on each of the allocated descriptors. A descrambler is provided for sequentially accessing each allocated descriptor. If the processing indications of the accessed descriptor are set to indicate that descrambling processing may be performed on the accessed descriptor (and transport packet to which the accessed descriptor points), then the descrambler processes the descriptor and transport packet to which it points. Specifically, if the descriptor points to a to-be-descrambled transport packet, the descrambler descrambles the transport packet using the control word information in the accessed descriptor.

The descrambler may be located on the (receipt) adaptor, in which case the descrambler processing occurs after processing by the data link control circuit (e.g., descriptor allocation, receipt time recording, etc.) but before processing by the direct memory access circuit (e.g., transfer to the memory). Alternatively, the descrambler may be a separate device connected to the asynchronous communication interface, in which case descrambler processing occurs after processing by the direct memory access circuit but before processing by the processor (e.g., estimated departure time calculation, PID remapping, etc.). In either case, the control word information is a base address of a PID index-able control word table maintained by the processor.

In the case of scrambling, the processor defines a sequence of one or more processing steps to be performed on each transport packet and orders scrambling processing within the sequence. The processor allocates a transmit descriptor of a transmit queue to each to-be-transmitted transport packet and stores control word information associated with contents of the transport packet in the control word information storage location of selected ones of the allocated descriptors. The processor then sets one or more processing indications of the descriptor to indicate that the next step of processing of the sequence may be performed on each of the allocated descriptors. A scrambler is provided for sequentially accessing each allocated descriptor. The scrambler processes each accessed descriptor and transport packet to which the accessed descriptor points, but only if the processing indications of the accessed descriptors are set to indicate that scrambling processing may be performed on the accessed descriptor (and transport packet to which the accessed descriptor points). Specifically, if the accessed descriptor points to a to-be-scrambled transport packet, the scrambler scrambles the transport packet pointed to by the accessed descriptor using the control word information in the accessed descriptor.

The scrambler may be located on the (transmit) adaptor, in which case the scrambler processing occurs after processing by the direct memory access circuit (e.g., transfer from the memory to the cache, etc.) but before processing by the data link control circuit (e.g., output at the correct time slot, final PCR correction, etc.). Alternatively, the scrambler may be a separate device connected to the asynchronous communication interface, in which case descrambler processing occurs after processing by the processor (e.g., transmit queue descriptor allocation, dispatch time assignment, PCR correction, etc.) but before processing by the direct memory access circuit. The control word information may be a base address of a PID index-able control word table maintained by the processor, as with descrambling. Preferably, however, the control word information is the control word itself, used to scramble the transport packet.

In addition, according to an embodiment, a method is provided for re-timing video program bearing data received via an asynchronous communication link. An asynchronous interface (e.g., an Ethernet interface, ATM interface, etc.) is connected to the remultiplexer node processor (e.g., via a bus) for receiving a video program bearing bit stream from a communication link having a varying end-to-end transmission delay. The processor determines a time at which each of one or more received packets carrying data of the same program of the received bit stream should appear in an outputted TS based on a plurality of time stamps of the program carried in the received bit stream. A synchronous interface, such as a transmit adaptor, selectively transmits selected transport packets carrying received data in an outputted TS with a constant end-to-end delay at times that depend on the determined times.

Illustratively, the remultiplexer node memory stores packets containing data received from the received bit stream in a receipt queue. The processor identifies each packet containing data of a program stored in the receipt queue between first and second particular packets containing consecutive time stamps of that program. The processor determines a (transport) packet rate of the program based on a difference between the first and second time stamps. The processor assigns as a transmit time to each of the identified packets, the sum of a transmit time assigned to the first particular packet and a product of the (transport) packet rate and an offset of the identified packet from the first packet.

According to yet another embodiment, a method is provided for dynamically and seamlessly varying remultiplexing according to a changed user specification. An interface, such as a first adaptor, selectively extracts only particular ones of the transport packets from a TS according to an initial user specification for remultiplexed TS content. A second interface, such as a second adaptor, reassembles selected ones of the extracted transport packets, and, transport packets containing PSI, if any, into an outputted remultiplexed TS, according to the initial user specification for remultiplexed TS content. The second adaptor furthermore outputs the reassembled remultiplexed TS as a continuous bitstream. The processor dynamically receives one or more new user specifications for remultiplexed TS content which specifies one or more of: (I) different transport packets to be extracted and/or (II) different transport packets to be reassembled, while the first and second adaptors extract transport packets and reassemble and output the remultiplexed TS. In response, the processor causes the first and second adaptors to dynamically cease to extract or reassemble transport packets according to the initial user specification and to dynamically begin to extract or reassemble transport packets according to the new user specification without introducing a discontinuity in the outputted remultiplexed transport stream. For example, the processor may generate substitute PSI that references different transport packets as per the new user specification, for reassembly by the second adaptor.

Illustratively, this seamless remultiplexing variation technique can be used to automatically ensure that the correct ES information of each selected program is always outputted in the remultiplexed outputted TS, despite any changes in the ES make up of that program. A controller may be provided for generating a user specification indicating one or more programs of the inputted TSs to be outputted in the output TS. The first adaptor continuously captures program definitions of an inputted TS. The processor continuously determines from the captured program definitions which elementary streams make up each program. The second adaptor outputs in the outputted TS each transport packet containing ES data of each ES determined to make up each program indicated to be outputted by the user specification without introducing a discontinuity into the outputted TS. Thus, even if the PIDs of the ESs that make up each program change (in number or value) the correct and complete ES data for each program is nevertheless always outputted in the outputted TS.

According to yet another embodiment, a method is provided for optimizing the bandwidth of a TS which has null transport packets inserted therein. The first interface (adaptor) receives a TS at a predetermined bit rate, which TS includes variably compressed program data bearing transport packets and one or more null transport packets. Each of the null transport packets is inserted into a time slot of the received TS to maintain the predetermined bit rate of the TS when none of the compressed program data bearing transport packets are available for insertion into the received TS at the respective transport packet time slot. The processor selectively replaces one or more of the null transport packets with another to-be-remultiplexed data bearing transport packet. Such replacement data bearing transport packets may contain PSI data or even bursty transactional data, which bursty transactional data has no bit rate or transmission latency requirement for presenting information in a continuous fashion.

Illustratively, the processor extracts selected ones of the transport packets of the received TS and discards each non-selected transport packet including each null transport packet. The selected transport packets are stored in the memory by the processor and first adaptor. As described above, the processor schedules each of the stored transport packets for output in an outputted transport stream at a time that depends on a time at which each of the stored transport packets are received. A second interface (adaptor) outputs each of the stored transport packets in a time slot that corresponds to the schedule. If no transport packet is scheduled for output at one of the time slots of the outputted TS, the second adaptor outputs a null transport packet. Nevertheless, null transport packets occupy less bandwidth in the outputted TS than in each inputted TS.

According to an additional embodiment, a method is provided for timely outputting compressed program data bearing bit streams on an asynchronous communication link. A synchronous interface (adaptor) provides a bit stream containing transport packets. The processor assigns dispatch times to each of one or more selected ones of the transport packets to maintain a predetermined bit rate of a program for which each selected transport packet carries data and to incur an average latency for each selected transport packet. At times that depend on each of the dispatch times, the asynchronous communication interface receives one or more commands and responds thereto by transmitting the corresponding selected transport packets at approximately the dispatch times so as to minimize a jitter of selected transport packets.

Illustratively, the commands are generated as follows. The processor enqueues transmit descriptors containing the above dispatch times, into a transmit queue. The processor assigns an adaptor of the remultiplexer node to servicing the transmit queue on behalf of the asynchronous interface. The data link control circuit of the assigned adaptor causes each command to issue when the dispatch times of the descriptors equal the time of the reference clock at the adaptor.

Various ones of these techniques may be used to enable network distributed remultiplexing. A network is provided with one or more communication links, and a plurality of nodes, interconnected by the communication links into a communications network. A destination node receives a first bit stream containing data of one or more programs via one of the communications links, the first bit stream having one or more predetermined bit rates for portions thereof. The destination node can be a remultiplexer node as described above and in any event includes a processor. The processor chooses at least part of the received first bit stream for transmission, and schedules transmission of the chosen part of the first bit stream so as to output the chosen part of the first bit stream in a TS at a rate depending on a predetermined rate of the chosen part of said first bit stream.

In the alternative, the communication links collectively form a shared communications medium. The nodes are divided into a first set of one or more nodes for transmitting one or more bit streams onto the shared communications medium, and a second set of one or more nodes for receiving the transmitted bit streams from the shared communications medium. The nodes of the second set select portions of the transmitted bit streams and transmit one or more remultiplexed TSs as a bit stream containing the selected portions. Each of the transmitted remultiplexed TSs are different than the received ones of the transmitted bit streams. A controller node is provided for selecting the first and second sets of nodes and for causing the selected nodes to communicate the bit streams via the shared communication medium according to one of plural different signal flow patterns, including at least one signal flow pattern that is different from a topological connection of the nodes to the shared communication medium.

Finally, a method is provided for synchronizing the reference clock at each of multiple circuits that receive or transmit transport packets in a remultiplexing system. The reference clock at each circuit that receives transport packets is for indicating a time at which each transport packet is received thereat. The reference clock at each circuit that transmits transport packets is for indicating when to transmit each transport packet therefrom. A master reference clock, to which each other one of the reference clocks is to be synchronized, is designated. The current time of the master reference clock is periodically obtained. Each other reference clock is adjusted according to a difference between the respective time at the other reference clocks and the current time of the master reference clock so as to match a time of the respective reference clock to a corresponding time of the master reference clock.

Thus, according to the invention, a more flexible remultiplexing system is provided. The increased flexibility enhances multiplexing yet decreases overall system cost.

BRIEF DESCRIPTION OF THE DRAWING

FIG. 3 shows a flow chart which schematically illustrates how transport packets are processed depending on their PIDs in a remultiplexing node according to an embodiment of the present invention.

DETAILED DESCRIPTION OF THE INVENTION

For sake of clarity, the description of the invention is divided into sections.

Remultiplexer Environment and Overview

Figure 1:
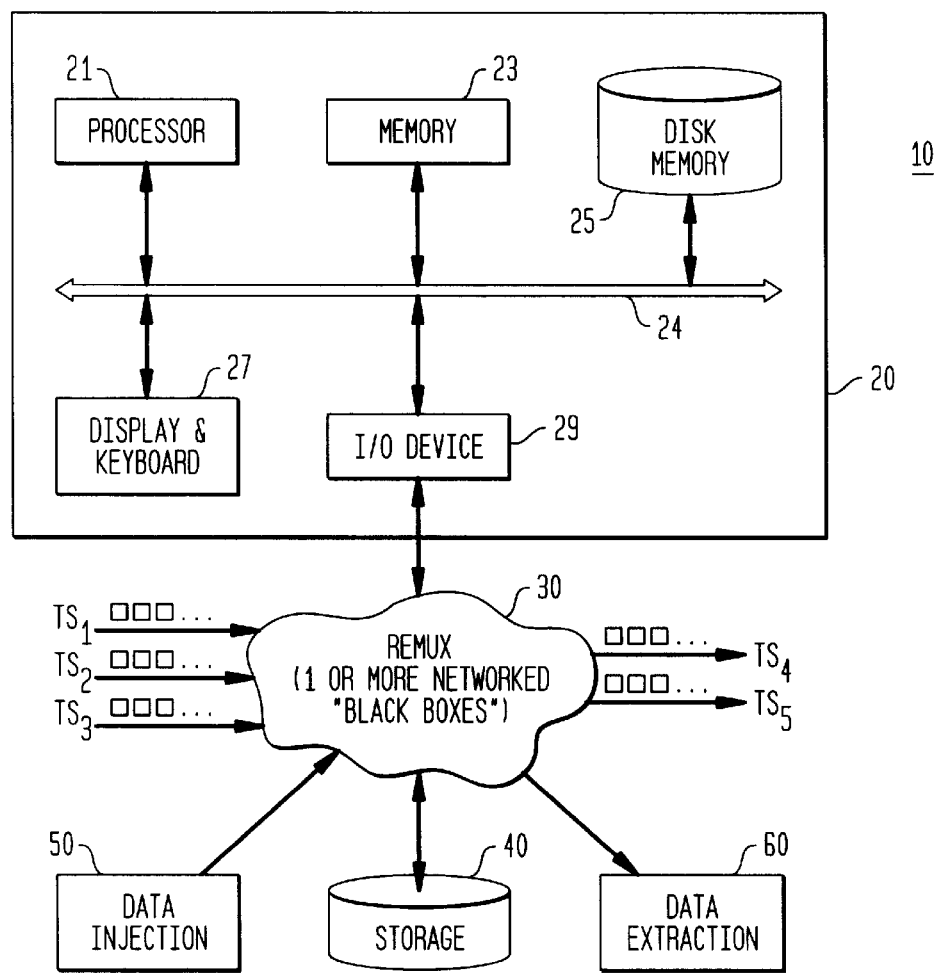
FIG. 1 shows a remultiplexing environment according to another embodiment of the present invention.
Figure 4:
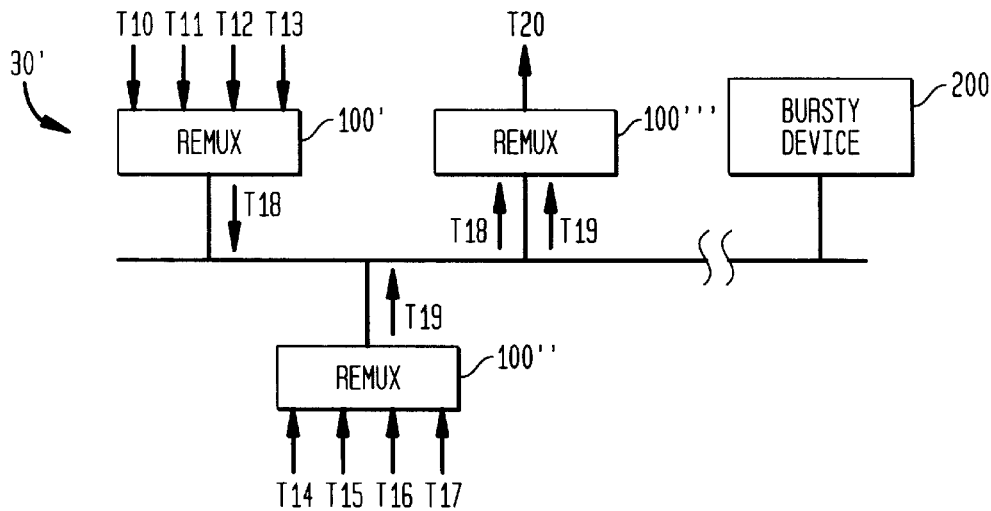
FIG. 4 shows a network distributed remultiplexer according to an embodiment of the present invention.

FIG. 1 shows a basic remultiplexing environment 10 according to an embodiment of the present invention. A controller 20 provides instructions to a remultiplexer 30 using, for example, any remote procedure call (RPC) protocol. Examples of RPCs that can be used include the digital distributed computing environment protocol (DCE) and the open network computing protocol (ONC). DCE and ONC are network protocols employing protocol stacks that allow a client process to execute a subroutine either locally on the same platform (e.g., controller 20) or on a remote, different platform (e.g., in remultiplexer 30). In other words, the client process can issue control instructions by simple subroutine calls. The DCE or ONC processes issue the appropriate signals and commands to the remultiplexer 30 for effecting the desired control.

The controller 20 may be in the form of a computer, such as a PC compatible computer. The controller 20 includes a processor 21, such as one or more Intel™ Pentium II™ integrated circuits, a main memory 23, a disk memory 25, a monitor and keyboard/mouse 27 and one or more I/O devices 29 connected to a bus 24. The I/O device 29 is any suitable I/O device 29 for communicating with the remultiplexer 30, depending on how the remultiplexer 30 is implemented. Examples of such an I/O device 29 include an RS-422 interface, an Ethernet interface, a modem, and a USB interface.

The remultiplexer 30 is implemented with one or more networked "black boxes". In the example remultiplexer architecture described below, the remultiplexer 30 black boxes may be stand alone PC compatible computers that are interconnected by communications links such as Ethernet, ATM or DS3 communications links. For example, remultiplexer 30 includes one or more black boxes which each are stand alone PC compatible computers interconnected by an Ethernet network (10 BASE-T, 100 BASE-T or 1000 BASE-T, etc.).

As shown, one or more to-be-remultiplexed TSs, namely, TS1, TS2 and TS3, are received at the remultiplexer 30. As a result of the remultiplexing operation of the remultiplexer 30, one or more TSs, namely, TS4 and TS5, are outputted from the remultiplexer 30. The remultiplexed TSs TS4 and TS5 illustratively, include at least some information (at least one transport packet) from the inputted TSs TS1, TS2 and TS3. At least one storage device 40, e.g., a disk memory or server, is also provided. The storage device 40 can produce TSs or data as inputted, to-be-remultiplexed information for remultiplexing into the outputted TSs TS4 or TS5 by the remultiplexer 30. Likewise, the storage device 40 can store TSs information or data produced by the remultiplexer 30, such as transport packets extracted or copied from the inputted TSs TS1, TS2 or TS3, other information received at the remultiplexer 30 or information generated by the remultiplexer 30.

Also shown are one or more data injection sources 50 and one or more data extraction destinations 60. These sources 50 and destinations 60 may themselves be implemented as PC compatible computers. However, the sources 50 may also be devices such as cameras, video tape players, communication demodulators/receivers and the destinations may be display monitors, video tape recorders, communications modulators/transmitters, etc. The data injection sources 50 supply TS, ES or other data to the remultiplexer 30, e.g., for remultiplexing into the outputted TSs TS4 and/or TS5. Likewise, the data extraction destinations 60 receive TS, ES or other data from the remultiplexer 30, e.g., that is extracted from the inputted TSs TS1, TS2 and/or TS3. For example, one data injection source 50 may be provided for producing each of the inputted, to-be-remultiplexed TSs, TS1, TS2 and TS3 and one data extraction destination 60 may be provided for receiving each outputted remultiplexed TS TS4 and TS5.

The environment 10 may be viewed as a network. In such a case, the controller 20, each data injection source 50, storage device 40, data extraction destination 60 and each "networked black box" of the remultiplexer 30 in the environment 10 may be viewed as a node of the communications network. Each node may be connected by a synchronous or asynchronous communication link. In addition, the separation of the devices 20, 40, 50 and 60 from the remultiplexer 30 is merely for sake of convenience. In an alternative embodiment, the devices 20, 40, 50 and 60 are part of the remultiplexer 30.

Remultiplexer Architecture

Figure 2:
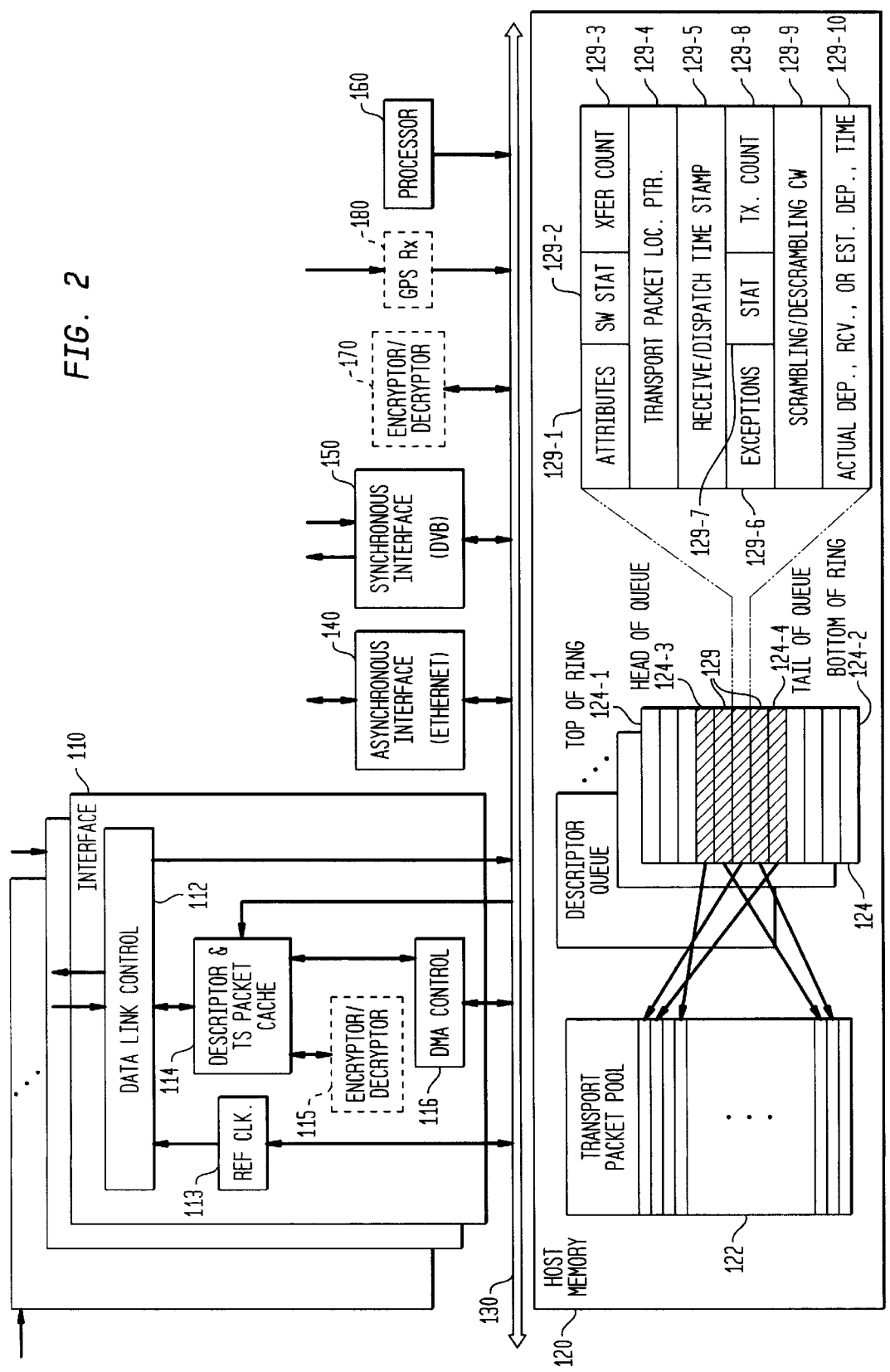
FIG. 2 shows a remultiplexer node using an asynchronous platform according to an embodiment of the present invention.

FIG. 2 shows a basic architecture for one of the network black boxes or nodes 100 of the remultiplexer 30, referred to herein as a "remultiplexer node" 100. The particular remultiplexer node 100 shown in FIG. 2 can serve as the entire remultiplexer 30. Alternatively, as will be appreciated from the discussion below, different portions of the remultiplexer node 100 can be distributed in separate nodes that are interconnected to each other by synchronous or asynchronous communication links. In yet another embodiment, multiple remultiplexer nodes 100, having the same architecture as shown in FIG. 2, are interconnected to each other via synchronous or asynchronous communication links and can be programmed to act in concert. These latter two embodiments are referred to herein as network distributed remultiplexers.

Illustratively, the remultiplexer node 100 is a Windows NT™ compatible PC computer platform. The remultiplexer node 100 includes one or more adaptors 110. Each adaptor 110 is connected to a bus 130, which illustratively is a PCI compatible bus. A host memory 120 is also connected to the bus 130. A processor 160, such as an Intel™ Pentium II™ integrated circuit is also connected to the bus 130. It should be noted that the single bus architecture shown in FIG. 2 may be a simplified representation of a more complex multiple bus structure. Furthermore, more than one processor 160 may be present which cooperate in performing the processing functions described below.

Illustratively, two interfaces 140 and 150 are provided. These interfaces 140 and 150 are connected to the bus 130, although they may in fact be directly connected to an I/O expansion bus (not shown) which in turn is connected to the bus 130 via an I/O bridge (not shown). The interface 140 illustratively is an asynchronous interface, such as an Ethernet interface. This means that data transmitted via the interface 140 is not guaranteed to occur at precisely any time and may experience a variable end-to-end delay. On the other hand, the interface 150 is a synchronous interface, such as a T1 interface. Communication on the communication link connected to the interface 150 is synchronized to a clock signal maintained at the interface 150. Data is transmitted via the interface 150 at a particular time and experiences a constant end-to-end delay.

FIG. 2 also shows that the remultiplexer node 100 can have an optional scrambler/descrambler (which may be implemented as an encryptor/decryptor) 170 and/or a global positioning satellite (GPS) receiver 180. The scrambler/descrambler 170 is for scrambling or descrambling data in transport packets. The GPS receiver 180 is for receiving a uniform clock signal for purposes of synchronizing the remultiplexer node 100. The purpose and operation of these devices is described in greater detail below.

Each adaptor 110 is a specialized type of synchronous interface. Each adaptor 110 has one or more data link control circuits 112, a reference clock generator 113, one or more descriptor and transport packet caches 114, an optional scrambler/descrambler 115 and one or more DMA control circuits 116. These circuits may be part of one or more processors. Preferably, they are implemented using finite state automata, i.e., as in one or more ASICs or gate arrays (PGAs, FPGAs, etc.). The purpose of each of these circuits is described below.

The reference clock generator 113 illustratively is a 32 bit roll-over counter that counts at 27 MHZ. The system time produced by the reference clock generator 113 can be received at the data link control circuit 112. Furthermore, the processor 160 can directly access the reference clock generator 113 as follows. The processor 160 can read the current system time from an I/O register of the reference clock generator 113. The processor 160 can load a particular value into this same I/O register of the reference clock generator 113. Finally, the processor 160 can set the count frequency of the reference clock generator in an adjustment register so that the reference clock generator 113 counts at a frequency within a particular range.

The purpose of the cache 114 is to temporarily store the next one or more to-be-outputted transport packets pending output from the adaptor 110 or the last one or more transport packets recently received at the adaptor 110. The use of the cache 114 enables transport packets to be received and stored or to be retrieved and outputted with minimal latency (most notably without incurring transfer latency across the bus 130). The cache 114 also stores descriptor data for each transport packet. The purpose and structure of such descriptors is described in greater detail below. In addition, the cache 114 stores a filter map that can be downloaded and modified by the processor 160 in normal operation. Illustratively, the cache 114 may also store control word information for use in scrambling or descrambling, as described in greater detail below. In addition to the processor 160, the cache 114 is accessed by the data link control circuit 112, the DMA control circuit 116 and the optional scrambler/descrambler 115.

As is well known, the cache memory 114 may posses a facsimile or modified copy of data in the host memory 120. Likewise, when needed, the cache 114 should obtain the modified copy of any data in the host memory and not a stale copy in its possession. The same is true for the host memory 120. An "ownership protocol" is employed whereby only a single device, such as the cache memory 114 or host memory 120, has permission to modify the contents of a data storage location at any one time. Herein, the cache memory 114 is said to obtain control of a data storage location when the cache memory has exclusive control to modify the contents of such storage locations. Typically, the cache memory 114 obtains control of the storage location and a facsimile copy of the data stored therein, modifies its copy but defers writing the modifications of the data to the host memory until a later time. By implication, when the cache memory writes data to a storage location in the host memory, the cache memory 114 relinquishes control to the host memory 120.

The DMA control circuit 116 is for transferring transport packet data and descriptor data between the host memory 120 and the cache 114. The DMA control circuit 116 can maintain a sufficient number of transport packets (and descriptors therefor) in the cache 114 to enable the data link control circuit 112 to output transport packets in the output TS continuously (i.e., in successive time slots). The DMA control circuit 116 can also obtain control of a sufficient number of descriptor storage locations, and the packet storage locations to which they point, in the cache 114. The DMA control circuit 116 obtains control of such descriptor and transport packet storage locations for the cache 114. This enables continuous allocation of descriptors and transport packet storage locations to incoming transport packets as they are received (i.e., from successive time slots).

The data link control circuit 112 is for receiving transport packets from an incoming TS or for transmitting transport packets on an outgoing TS. When receiving transport packets, the data link control circuit 112 filters out and retains only selected transport packets received from the incoming TS as specified in a downloadable filter map (provided by the processor 160). The data link control circuit 112 discards each other transport packet. The data link control circuit 112 allocates the next unused descriptor to the received transport packet and stores the received transport packet in the cache 114 for transfer to the transport packet storage location to which the allocated descriptor points. The data link control circuit 112 furthermore obtains the reference time from the reference clock generator 113 corresponding to the receipt time of the transport packet. The data link control circuit 112 records this time as the receipt time stamp in the descriptor that points to the transport packet storage location in which the transport packet is stored.

When transmitting packets, the data link control circuit 112 retrieves descriptors for outgoing transport packets from the cache 114 and transmits the corresponding transport packets in time slots of the outgoing TS that occur when the time of the reference clock generator 113 approximately equals the dispatch times indicated in the respective descriptors. The data link control circuit 112 furthermore performs any final PCR correction in outputted transport packets as necessary so that the PCR indicated in the transport packets is synchronized with the precise alignment of the transport packet in the outgoing TS.

The processor 160 is for receiving control instructions from the external controller 20 (FIG. 1) and for transmitting commands to the adaptor 110, and the interfaces, 140 and 150 for purposes of controlling them. In response, to such instructions, the processor 160 generates a PID filter map and downloads it to the cache 114, or modifies the PID filter map already resident in the cache 114, for use by the data link control circuit 112 in selectively extracting desired transport packets. In addition, the processor 160 generates interrupt receive handlers for processing each received transport packet based on its PID. Receipt interrupt handlers may cause the processor 160 to remap the PID of a transport packet, estimate the departure time of a transport packet, extract the information in a transport packet for further processing, etc. In addition, the processor 160 formulates and executes transmit interrupt handlers which cause the processor to properly sequence transport packets for output, to generate dispatch times for each transport packet, to coarsely correct PCRs in transport packets and to insert PSI into an outputted TS. The processor 160 may also assist in scrambling and descrambling as described in greater detail below.

The host memory 120 is for storing transport packets and descriptors associated therewith. The host memory 120 storage locations are organized as follows. A buffer 122 is provided containing multiple reusable transport packet storage locations for use as a transport packet pool. Descriptor storage locations 129 are organized into multiple rings 124. Each ring 124 is a sequence of descriptor storage locations 129 from a starting memory address or top of ring 124-1 to an ending memory address or bottom of ring 124-2. One ring 124 is provided for each outgoing TS transmitted from the remultiplexer node 100 and one ring 124 is provided for each incoming TS received at the remultiplexer node 100. Other rings 124 may be provided as described in greater detail below.

A queue is implemented in each ring 124 by designating a pointer 124-3 to a head of the queue or first used/allocated descriptor storage location 129 in the queue and a pointer 124-4 to a tail of the queue or last used/allocated descriptor storage location 129 in the queue. Descriptor storage locations 129 are allocated for incoming transport packets starting with the unused/non-allocated descriptor storage location 129 immediately following the tail 124-4. Descriptor storage locations 129 for outgoing transport packets are retrieved from the queue starting from the descriptor storage location 129 pointed to by the head 124-3 and proceeding in sequence to the tail 124-4. Whenever the descriptor of the descriptor storage location 129 at the end of the ring 124-2 is reached, allocation or retrieval of descriptors from descriptor storage locations 129 continues with the descriptor of the descriptor storage location 129 at the top of the ring 124-1.

As shown, each descriptor stored in each descriptor storage location 129 includes a number of fields 129-1, 129-2, 129-3, 129-4, 129-5, 129-6, 129-7, 129-8, 129-9 and 129-10. Briefly stated, the purpose of each of these fields is as follows. The field 129-1 is for storing command attributes. The processor 160 can use individual bits of the command attribute field to control the transport packet transmission and descriptor data retrieval of the adaptor 110. For instance, the processor 160 can preset a bit in the field 129-1 of a descriptor in the descriptor storage location 129 pointed to by the bottom 124-2 of the ring 124 to indicate that the descriptor storage location 129 pointed to by the top pointer 124-1 follows the descriptor storage location 129 pointed to by the bottom pointer 124-2.

The field 129-2 is for storing software status bits. These bits are neither accessed nor modified by the adaptor 110 and can be used by the processor 160 for any purposes not involving the adaptor 110.

The field 129-3 is for storing the number of bytes of a to-be-outputted, outgoing transport packet (typically 188 bytes for MPEG-2 transport packets but can be set to a larger or smaller number when the descriptor points to packets according to a different transport protocol or for "gather" and "scatter" support, where packets are fragmented into multiple storage locations or assembled from fragments stored in multiple packet storage locations).

The field 129-4 is for storing a pointer to the transport packet storage location to which the descriptor corresponds. This is illustrated in FIG. 2 by use of arrows from the descriptors in descriptor storage locations 129 in the ring 124 to specific storage locations of the transport packet pool 122.

The field 129-5 is for storing the receipt time for an incoming received transport packet or for storing the dispatch time of an outgoing to-be-transmitted transport packet.

The field 129-6 is for storing various exceptions/errors which may have occurred. The bits of this field may be used to indicate a bus 130 error, a data link error on the communication link to which the data link control circuit 112 is connected, receipt of a short or long packet (having less than or more than 188 bytes), etc.

The field 129-7 is for storing status bits that indicate different status aspects of a descriptor such as whether or not the descriptor is valid, invalid pointing to an errored packet, etc. For example, suppose that multiple devices must process the descriptor and/or packet to which it points in succession. In such a case, four status bits are preferably provided. The first two of these bits can be set to the values 0, 1, 2 or 3. The value 0 indicates that the descriptor is invalid. The value 1 indicates that the descriptor is valid and may be processed by the last device that must process the descriptor and/or packet to which it points. The value 2 indicates that the descriptor is valid and may be processed by the second to last device that must process the descriptor and/or packet to which it points. The value 3 indicates that the descriptor is valid and may be processed by the third to last device that must process the descriptor and/or packet to which it points. The latter two bits indicate whether or not the descriptor has been fetched from the host memory 120 to the cache 114 and whether or not the descriptor has completed processing at the adaptor 110 and may be stored in the host memory 120. Other status bits may be provided as described in greater detail below.

The field 129-8 contains a transfer count indicating the number of bytes in a received incoming transport packet.

The field 129-9 is for storing a scrambling/descrambling control word or other information for use in scrambling or descrambling. For example, the processor 160 can store a control word (encryption/decryption key) or base address to a table of control words stored in the cache 114 in this field 129-9.

Field 129-10 is for storing a scheduled estimated departure time, actual departure time or actual receipt time. As described in greater detail below, this field is used by the processor 160 for ordering received incoming transport packets for output or for noting the receipt time of incoming transport packets.

Illustratively, one data link control circuit 112, one DMA control circuit 116 and one ring 124 is needed for receiving transport packets at a single input port, and one data link control circuit 112, one DMA control circuit 116 and one ring 124 is needed for transmitting transport packets from a single output port. Descriptors stored in queues associated with input ports are referred to herein as receipt descriptors and descriptors stored in queues associated with output ports are referred to herein as transmit descriptors. As noted below, the input and output ports referred to above may be the input or output port of the communication link to which the data link control circuit 112 is connected or the input or output port of the communication link of another interface 140 or 150 in the remultiplexer node 100. The adaptor 110 is shown as having only a single data link control circuit 112 and a single DMA control circuit 116. This is merely for sake of illustration—multiple data link control circuits 112 and DMA control circuits 116 can be provided on the same adaptor 110. Alternatively, or additionally, multiple adaptors 110 are provided in the remultiplexer node 100.

Basic Transport Packet Receipt, Remultiplexing and Transmission

Consider now the basic operation of the remultiplexer node 100. The operator is provided with a number of choices in how to operate the remultiplexer node 100. In a first manner of operating the remultiplexer node 100, assume that the operator wishes to selectively combine program information of two TSs, namely, TS1 and TS2, into a third TS, namely, TS3. In this scenario, assume that the operator does not initially know what programs, ESs or PIDs are contained in the two to-be-remultiplexed TSs TS1 and TS2. In addition, TS1 illustratively is received at a first adaptor 110, TS2 illustratively is received at a second adaptor 110 and TS3 illustratively is transmitted from a third adaptor 110 of the same remultiplexer node 100. As will be appreciated from the description below, each of TS1 and TS2 may instead be received via synchronous or asynchronous interfaces at the same node or at different nodes, and selected portions of TS1 and TS2 may be communicated to a third node via a network of arbitrary configuration for selective combination to form TS3 at the third node.

The operation according to this manner may be summarized as (1) acquiring the content information (program, ES, PAT, PMT, CAT, NIT, etc., and PIDs thereof) of the inputted, to-be-remultiplexed TSs TS1 and TS2; (2) reporting the content information to the operator so that the operator can formulate a user specification; and (3) receiving a user specification for constructing the outputted remultiplexed TS TS3 and dynamically constructing the remultiplexed TS TS3 from the content of the inputted to-be-remultiplexed TSs TS1 and TS2 according to the user specification.

To enable acquisition of the content information, the transport processor 160 allocates one receipt queue to each of the first and second adaptors 110 that receive the TSs TS1 and TS2, respectively. To acquire the content of the TSs TS1 and TS2, no transport packets are discarded at the adaptors 110 for TS1 or TS2 initially. Thus, the processor 160 loads a filter map into the caches 114 of each of the first and second adaptors 110 receiving the TSs TS1 and TS2 causing each transport packet to be retained and transferred to the host memory 120. As each transport packet of a TS (e.g., the TS1) is received at its respective adaptor 110, the data link control circuit 112 allocates the next unused descriptor (following the descriptor stored in the descriptor storage location at the tail 124-4 of the receipt queue), to the received, incoming transport packet. The data link control circuit 112 stores each received transport packet in a transport packet storage location of the cache 114 to which the allocated descriptor points.

The DMA control circuit 116 writes each transport packet to its corresponding storage location of the pool 122 in the host memory 120 and writes descriptor data of the descriptors allocated to the transport packets to their respective descriptor storage locations of the receipt queue. The DMA control circuit 116 may furthermore obtain control of the next few non-allocated descriptor storage locations 129 of the receipt queue (following the storage locations of the sequence of descriptors 129 for which the DMA control circuit 116 had obtained control previously), copies of the descriptors stored therein and the transport packet storage locations to which the descriptors point. Control of such unused, non allocated descriptors and transport packet storage locations is provided to the cache 114 for used by the data link control circuit 112 (i.e., allocation to future transport packets received from TS1).

After the DMA control circuit 116 writes i≧1 transport packets and data of descriptors allocated thereto to the pool 122 and the receipt queue, the DMA control circuit 116 generates an interrupt. Illustratively, the number i may be selected by the operator using controller 20 and set by the processor 160. The interrupt causes the processor 160 to execute an appropriate receipt "PID" handler subroutine for each received transport packet. Alternatively, another technique such as polling or a timer based process can be used to initiate the processor 160 to execute a receipt PID handler subroutine for each received transport packet. For sake of clarity, an interrupt paradigm is used to illustrate the invention herein. Referring to FIG. 3, the processor 160 illustratively has a set of PID handler subroutines for each adaptor 110 (or other device) that receives or transmits a TS during a remultiplexing session. FIG. 3 illustrates two types of PID handler subroutine sets, namely, a receipt PID handler subroutine set and a transmit PID handler subroutine set. Each DMA control circuit 116 generates a recognizably different interrupt thereby enabling the processor 160 to determine which set of PID handler subroutines to use. In response to the interrupt by the DMA control circuit 116, the processor 160 executes step S2 according to which the processor 160 examines the PID of each transport packet pointed to by a recently stored descriptor in the receipt queue of the interrupting adaptor 110. For each PID, the processor 160 consults a table of pointers to receipt PID handler subroutines 402 specific to the adaptor 110 (or other device) that interrupted the processor 160.

Assume that the first adaptor 110 receiving TS1 interrupts the processor 160, in which case the processor 160 determines to consult a table of pointers to receipt PID handler subroutines 402 specific to the adaptor 110 that received the TS TS1 . The table of pointers to receipt PID handler subroutines includes 8192 entries, including one entry indexed by each permissible PID (which PIDs have 13 bits according to MPEG-2). Each indexed entry contains a pointer to, or address of, RIV0, RIV1, . . . , RIV8191, a subroutine to be executed by the processor 160. Using the PID of each transport packet, the processor 160 indexes the entry of the table of pointers to receipt PID handler subroutines 402 in order to identify the pointer to the subroutine to be executed for that particular transport packet.

Each subroutine pointed to by the respective pointer, and executed by the processor 160, is specifically mapped to each PID by virtue of the pointer table 402 to achieve the user's specification. Each subroutine is advantageously predefined and simply mapped by the pointer table 402 according to the user specification. Each subroutine is composed of a collection of one or more basic building block processes. Some examples of basic building block processes include:

(1) PAT acquisition: Initially, this process is included in the subroutine pointed to by RIV0, the receive PID handler subroutine for PID 0x0000. In executing this process, the processor 160 illustratively extracts the section of the PAI carried in the currently processed transport packet and loads the PAT section into the PAT maintained in memory. Note that multiple versions of the PAT may be used as the programs carried in the TS can change from time to time. The processor 160 is capable of identifying different versions of the PAT and separately aggregating and maintaining a copy of each version of the PAT in the host memory 120. The processor 160 is also capable of identifying which version of the PAT is currently in use at any time based on information contained in various sections of the PAT. The processor 160 also uses information carried in each updated PAT section to identify program numbers of programs carried in the TS at that moment and the PIDs of PMT sections or program definitions for such program numbers. Using such program numbers, the processor 160 can modify the pointer table 402 for the receipt PID handler subroutine to insert pointer for appropriate PIDs (labeling transport packets bearing PMT sections) for executing a subroutine containing a process for acquiring PMT sections/program definitions.

(2) PMT section/program definition acquisition: In this process, the processor 160 extracts the PMT section or program definition contained in the currently processed transport packet and updates the respective portion of the PMT with the extracted program definition or PMT section data. Like the PAT, multiple versions of the PMT may be utilized and the processor 160 can determine in which PMT to store the extracted PMT section or program definition data. The processor 160 may use PMT information to update a PID filter map used to discard transport packets of programs not to be included in the remultiplexed TS, to identify control words for descrambling ESs and to select subroutines for processing PCRs contained in transport packets having PIDs as identified in the PMT.

(3) PID remapping: This causes the processor 160 to overwrite the PID of the corresponding packet with a different PID. This is desirable to ensure uniqueness of PID assignment. That is, MPEG-2 requires that transport packets carrying different contents, e.g., data of different ESs, data of different PSI streams, etc., be labeled with mutually different PIDs, if such different content carrying transport packets are to be multiplexed into, and carried in, the same outputted remultiplexed TS. Otherwise, a decoder or other device would not be able to distinguish transport packets carrying different kinds of data for extraction, decoding, etc. It is possible that a certain PID is used in TS1 to label transport packets bearing a first type of data and the same PID is used in TS2 to label transport packets bearing a second type of data. If the transport packets of the first and second types are to be included in the outputted remultiplexed TS TS3, then at least one of the two types of transport packets should be re-labeled with a new PID to ensure uniqueness.

(4) Transport packet discarding: As the name suggests, the processor 160 simply discards the transport packet. To this end, the processor 160 deallocates the descriptor pointing to the discarded transport packet. Descriptor deallocation can be achieved by the processor 160 adjusting the sequence of descriptors resident in the descriptor storage locations 129 of the queue to remove the descriptor for the deleted transport packet (e.g., the processor identifies all of the allocated descriptors that follow the descriptor of the to-be-deleted transport packet in the ring 124 and moves each to the descriptor storage space of the immediately preceding descriptor). The deallocation of the descriptor creates a descriptor storage space 129 in the receipt queue for reallocation.

(5) PCR flag setting: The PMT indicates, for each program, the PIDs of the transport packets that carry the PCRs. However, only some of such transport packets carry PCRs. This can be easily determined by the processor 160 determining if the appropriate indicators in the transport packet are set (the adaption_field_control bits in the transport packet header and PCR_flag bit in the adaption field). If the processor 160 determines that a PCR is present, the processor 160 sets a PCR flag bit in the attribute field 129-1 of the descriptor 129 associated with the respective packet. The purpose of this attribute flag bit is described in greater detail below.

In addition, the processor 160 illustratively calculates the current drift of the reference clock generators 113 relative to the encoder system time clock of the program of which the PCR is a sample. Drift may be determined by the following formula:

$$drift = \Delta RTS12 - \Delta PCR12;$$

$$\Delta RTS12 = RTS2 - RTS1;$$

and $$\Delta PCR12 = PCR1 - PCR2$$

where:

$\Delta PCR12$ is a difference in successive PCRs for this program,

PCR2 is the PCR in the currently processed transport packet,

PCR1 is the previously received PCR for this program, $\Delta RTS12$ is a difference in successive receipt time stamps, RTS2 is the receipt time stamp recorded for the currently processed transport packet containing PCR2, and RTS1 is a previous receipt time stamp for the transport packet containing PCR1. After calculating the drift, PCR1 and RTS1 are set equal to PCR2 and RTS2, respectively. The drift is used for adjusting the PCR (if necessary) as described below.

(6) Estimated departure time calculation: According to this process, the processor 160 estimates the (ideal) departure time of the transport packet. Illustratively, this process is included in the receive interrupt handler for each received incoming transport packet to be remultiplexed into an outgoing TS. The estimated departure time can be estimated from the receipt time of the transport packet (in the field 129-5) and the known internal buffering delay at the remultiplexing node 100. The processor 160 writes the expected departure time in the field 129-10.

(7) Scrambling/descrambling control word information insertion: Typically, in either a scrambling or descrambling technique, a dynamically varying control word, such as an encryption or decryption key, is needed to actually scramble or descramble data in the transport packet. Common scrambling and descrambling techniques use odd and even keys, according to which, one key is used for decrypting ES data and the next key to be used subsequently is transferred contemporaneously in the TS. A signal is then transmitted indicating that the most recently transferred key should now be used. Scrambling/descrambling control words can be ES specific or used for a group of ESs (over an entire "conditional access system"). Descrambling or scrambling control words may be maintained in a PID index-able table at the remultiplexer node 100. As described in greater detail below, the processor 160 in executing this process may insert the base address for the control word table, or the control word itself, into the field 129-9 of a descriptor.

Initially, the processor 160 selects a PID handler for acquiring the PAT of each received TS TS1 and TS2 and thereafter discarding each processed transport packet. In the course of receiving the PAT, PIDs of other PSI bearing transport packets, such as program definitions/PMT sections, the NIT, and the CAT, and PIDs of other streams such as ES streams, ECM streams, EMM streams, etc. are obtained. The receipt PID handler subroutine for the PID of the PAT illustratively selects receipt PID handler subroutines for acquiring the PMT, NIT, CAT, etc. This can be achieved easily by having such subroutines available and simply changing the pointers of the entries (indexed by appropriate identified PIDs) in the table 402 to point to such PID handler subroutines. Note that such a simple PID handler subroutine selection process can be dynamically effected even while transport packets are received and processed for TS1 and TS2. The advantages of this are described in greater detail below.

Eventually, a sufficient amount of PSI regarding each TS TS1 and TS2 is acquired to enable the operator to create a user specification of the information to be outputted in the remultiplexed TS TS3. The processor 160 illustratively transmits to the controller 20 the acquired PSI information, e.g., using the asynchronous interface 140. Sufficient information for selecting a user specification is transmitted to the controller 20. This information may be selective, e.g., just a channel map of each TS showing the program numbers contained therein and the different kinds of ESs (described with descriptive service designations such as video, audio1, second audio presentation, closed caption text, etc.) Alternatively, the information may be exhaustive e.g., including the PIDs of each program, ECMs of ESs thereof, etc., and the controller 20 simply displays the information to the operator in a coherent and useful fashion.

Using the information provided, the operator generates a user specification for the outputted to-be-remultiplexed TS TS3. This user specification may specify:

(1) The program numbers in each TS TS1 and TS2 to be retained and outputted in the remultiplexed TS, TS3, (2) ESs of retained programs to be retained or discarded, (3) ESs, groups of ESs, programs or groups of programs to be descrambled and/or scrambled, and the source of the control words to be used in scrambling each ES, group of ESs, program or groups of programs, (4) Any new ECMs or EMMs to be injected or included in the outputted remultiplexed TS TS3, and (5) Any new PSI information not automatically implicated from the above selections such as an NIT or CAT to be placed in the outputted TS TS3, specific PIDs that are to be remapped and the new PIDs to which they should be remapped, PIDs assigned to other information (e.g., bursty data, as described below) generated at the remultiplexer node and carried in the TS TS3, etc.

The user specification is then transmitted from the controller 20 to the remultiplexer node 100, e.g., via the asynchronous interface 140.

The processor 160 receives the user specification and responds by selecting the appropriate receive PID handler subroutines for appropriate PIDs of each received, to-be-remultiplexed TS, TS1 and TS2. For example, for each PID labeling a transport packet containing data that is to be retained, the processor 160 selects a subroutine in which the processor inserts the process for estimating the departure time. For each PID labeling a transport packet containing scrambled data, the processor 160 selects a subroutine containing a process for selecting the appropriate control word and inserting it into the descriptor associated with such a transport packet. For each PID labeling a transport packet containing a PCR, the processor 160 can select a subroutine containing the process for setting the PCR flag and for calculating the drift, and so on. The dynamic adjustment of user specification and/or PSI data is described in greater detail below.

The processor 160 allocates a transmit queue to each device that transmits a remultiplexed TS, i.e., the third adaptor 110 that outputs the TS TS3. The processor 160 furthermore loads the PID filter maps in each cache 114 of the first and second adaptors 110 that receive the TSs TS1 and TS2 with the appropriate values for retaining those transport packets to be outputted in remultiplexed TS TS3, for retaining other transport packets containing PSI, for keeping track of the contents of TS1, and TS2 and for discarding each other transport packet.

In addition to selecting receive PID handler subroutines, allocating transmit queues and loading the appropriate PID filter map modifications, the processor 160 illustratively selects a set of transmit PID handler subroutines for each adaptor (or other device) that outputs a remultiplexed TS. This is shown in FIG. 3. The transmit PID handler subroutines are selected on a PID and transmit TS basis. As above, in response to receiving an identifiable interrupt (e.g., from a data link control circuit 112 of an adaptor 110 that transmits an outputted TS, such as TS3) the processor 160 executes step S4. In step S4, the processor 160 examines descriptors from the receipt queues (and/or possibly other queues containing descriptors of transport packets not yet scheduled for output) and identifies up to $j \geq 1$ descriptors pointing to transport packets to be outputted from the interrupting adaptor 110. The number j may illustratively be programmable and advantageously is set equal to the number k of transport packets transmitted from a specific adaptor 110 from which an output TS is transmitted between each time the specific adaptor 110 interrupts the processor 160.

In executing step S4, the processor 160 examines each receive queue for descriptors pointing to transport packets that are destined to the specific output TS. The processor 160 determines which transport packets are destined to the output TS by consulting a table of pointers to transmit PID handler subroutines 404. As with the table 402, the table 404 includes one entry for, and indexed by, each PID 0x0000 to 0x1FFF. Each indexed entry contains a pointer to, or address of, TIV0, TIV1, . . . , TIV8191, a subroutine to be executed in response to a respective PID. The table of pointers to transmit PID handler subroutines 404 is formulated by the processor 160 according to the user specification received from the controller 20, and modified as described below.

The following are illustrative processes that can be combined into a transmit PID handler subroutine:

(1) Nothing: If the current transport packet is not to be outputted in the remultiplexed TS (or other stream) of the device that issued the transmit interrupt to the processor 160, the PID of such a transport packet maps to a subroutine containing only this process. According to this process, the processor 160 simply skips the transport packet and descriptor therefor. The examined descriptor is not counted as one of the j transport packets to be outputted from the specific adaptor 110 that interrupted the processor 160.

(2) Order descriptor for transmission: If the current transport packet is to be outputted in the remultiplexed TS (or other stream) of the device that issued the transmit interrupt to the processor, the PID of such a transport packet maps to a subroutine containing this process (as well as possibly others). According to this process, the processor 160 allocates a transmit descriptor for this transport packet. The processor 160 then copies pertinent information in the receipt descriptor that points to the transport packet to the newly allocated transmit descriptor. The allocated transmit descriptor is then ordered in the proper sequence within a transmit queue, associated with the device that requested the interrupt, for transmission. In particular, the processor 160 compares the estimated departure time of the packet, to which the newly allocated descriptor points, to the actual dispatch time (the actual time that the transport packet will be transmitted) recorded in the other descriptors in the transmit queue. If possible, the descriptor is placed in the transmit queue before each descriptor with a later actual dispatch time than the estimated departure time of the descriptor and after each descriptor with an earlier actual dispatch time than the estimated departure time of the descriptor. Such an insertion can be achieved by copying each transmit descriptor, of the sequence of transmit descriptors with later actual dispatch times than the estimated dispatch time of the to-be-inserted descriptor, to the respective sequentially next descriptor storage location 129 of the queue. The data of the allocated transmit descriptor can then be stored in the descriptor storage location 129 made available by copying the sequence.

(3) Actual dispatch time determination: The processor 160 can determine the actual dispatch time of the transport packet to which the allocated descriptor points based on the estimated departure time of the transport packet. The actual dispatch time is set by determining in which transport packet time slot of the outputted remultiplexed TS T3 to transmit the transport packet (to which the newly allocated and inserted transmit descriptor points). That is, the transport packet time slot of the outputted TS T3 nearest in time to the estimated departure time is selected. The transport packet is presumed to be outputted at the time of the selected transport packet time slot, relative to the internal reference time as established by the reference clock generator(s) 113 of the adaptor(s) 110 (which are mutually synchronized as described below). The time associated with the respective transport packet slot time is assigned as the actual dispatch time. The actual dispatch time is then stored in field 129-5 of the transmit descriptor. As described below, the actual dispatch time is really an approximate time at which the data link control circuit 112 of the third adaptor 110 (which outputs the remultiplexed TS TS3) submits the corresponding transport packet for output. The actual output time of the transport packet depends on the alignment of the transport packet time slots, as established by an external clock not known to the processor 160. Additional steps may be carried out, as described below, to dejitter PCRs as a result of this misalignment.

Consider that the bit rates of the TS from which the packet was received (i.e., TS1 or TS2) may be different from the bit rate of the outputted TS, namely TS3. In addition, the transport packets will be internally buffered for a predetermined delay (that depends on the length of the receipt and transmit queues). Nevertheless, assuming that there is no contention between transport packets of different received TSs for the same transport packet slot of the outputted remultiplexed TS TS3, all transport packets will incur approximately the same latency in the remultiplexer node 100. Since the average latency is the same, no jitter is introduced into the transport packets.

Consider now the case that two transport packets are received at nearly the same time from different TSs, i.e., TS1 and TS2, and both are to be outputted in the remultiplexed TS TS3. Both transport packets may have different estimated departure times that nevertheless correspond to (are nearest in time to) the same transport packet time slot of the outputted remultiplexed TS TS3. The transport packet having the earliest estimated departure time (or receipt time) is assigned to the time slot and the actual dispatch time of this time slot. The other transport packet is assigned the next transport packet time slot of the outputted remultiplexed TS TS3 and the actual dispatch time thereof. Note that the latency incurred by the transport packet assigned to the next time slot is different from the average latency incurred by other transport packets of that program. Thus, the processor 160 illustratively takes steps to remove the latency incurred by this transport packet, including adjusting a PCR of the transport packet (if a PCR is contained therein).

(4) PCR drift and latency adjustment: This process illustratively is contained in the subroutine pointed to by the pointer of the table 404 indexed by the PIDs of transport packets containing PCRs. The processor 160 determines that PCR latency adjustment is only necessary if a transport packet is not assigned to the transport packet time slot of the outputted remultiplexed TS TS3 nearest in time to the estimated departure time of the transport packet (as is done for other transport packets of that program) and if the PCR flag is set in the respective receipt descriptor. PCRs are corrected for the displacement in time incurred by the assignment to the non-ideal slot. This adjustment equals the number of slots from the ideal slot by which the transport packet is displaced times the slot time.

All PCR's are adjusted for drift as described below unless the input and output TSs are exactly aligned in time or the PCR is received from an asynchronous communication link. In the former case, the drift of the internal clock does not affect the timing at which PCR's are outputted. In the latter case, a different drift adjustment is used as described below. In all other cases, the time at which received PCR's are outputted is affected by drift of the reference clock generator 113 of the adaptors 110 which received the transport packet and the adaptor 110 that transmits the transport packet, relative to the program clock of the PCR. That is, the transport packet containing the PCR is stamped with a receipt time stamp obtained from the reference clock generator 113. This receipt time stamp is used to determine the estimated departure time and the actual dispatch time. As described in detail below, transport packets are dispatched according to their actual dispatch time relative to the reference clock generator 113 on the adaptor 110 that transmits the TS TS3, and all reference clock generators 113 of all adaptors 110 are maintained in synchronicity. However, the reference clock generators 113, while all synchronized to each other, are subject to drift relative to the encoder system time clock that generated the transport packet and PCR thereof. This drift can impact the time at which each PCR is outputted from the remultiplexer node 100 in the outputted remultiplexed TS such as TS3.

According to the invention, the remultiplexer node 100 corrects for such drift. As noted above, part of the receipt handler subroutine for PCRs of each program is to maintain a current measure of drift. A measure of drift of the reference clock generators 113 relative to the encoder system time clock of each program is maintained. For each PCR, the current drift for the program of the PCR (i.e., between the reference clock generators 113 and the encoder system time clock of that program) is subtracted from the PCR.

With the above-noted allocation of queues, selection of PID handler subroutines, and modification of PID filter maps, remultiplexing is performed as follows. The transport packets of TS1 are received at the data link control circuit 112 of the first adaptor 110. Likewise, the transport packets of TS2 are received at the data link control circuit 112 of the second adaptor 110. The data link control circuit 112 in each of the first and second adaptors 110 consults the local PID filter map stored in the cache 114 thereat and selectively discards each transport packet having a PID indicating that the transport packet is not to be retained. Each data link control circuit 112 retrieves the next unused/non-allocated descriptor from the cache 114 and determines the transport packet storage location associated with the descriptor. (As noted above and below, the DMA control circuit 116 continuously obtains control of a sequence of one or more of the next unused, non-allocated descriptors of the receipt queue assigned to the input port of the data link control circuit 112 and the transport packet storage locations to which these descriptors point.) The next unused, non-allocated descriptor follows the descriptor stored in the descriptor storage location 129 pointed to by the tail pointer 129-4, which tail pointer 129-4 is available to the data link control circuit 112. (As noted above, if the tail pointer 129-4 equals the bottom of the ring address 129-2, the descriptor pointed to by the tail pointer 129-4 will have the end of descriptor ring command bit set in field 129-7 by the processor 160. This will cause the data link control circuit 112 to allocate the descriptor stored in the descriptor storage location 129 at the top of the ring address 129-1, using a wrap-around addressing technique.) The data link control circuit 112 obtains the time of the reference clock generator 113 corresponding to the time the first byte of the transport packet is received and stores this value as the receipt time stamp in the field 129-5 of the allocated descriptor. The data link control circuit 112 stores the number of bytes of the received transport packet in the field 129-8. Also, if any errors occurred in receiving the transport packet (e.g., loss of data link carrier of TS1, short packet, long packet, errored packet, etc.), the data link control circuit 112 indicates such errors by setting appropriate exception bits of 129-6. The data link control circuit 112 then sets a bit in the status field 129-7 indicating that the descriptor 129 has been processed or processed with exceptions and stores the transport packet at the transport packet storage location of cache 114 pointed to by the pointer in field 129-4. (Note that in the case of a long packet, a sequence of more than one of the next, unused non-allocated descriptors may be allocated to the received transport packet and the excess data stored in the packet storage locations associated with such descriptors. An appropriate gather/scatter bit is set in the attribute field 129-1 of the first of the descriptors to indicate that the packet has more data than in the single transport packet storage space associated with the first of the descriptors. A corresponding bit may also be set in the attribute field 129-1 of the last of the descriptors to indicate that it is the last descriptor of a multi-descriptor transfer. Such a long packet typically occurs when the adaptor receives packets from a stream other than a TS.)

The DMA control circuit 116 writes the transport packet to its corresponding transport packet storage location of transport packet pool 122 in the host memory 120. The DMA control circuit 116 also writes data of the descriptor that points to the written transport packet to the respective descriptor storage location 129 of the receipt queue assigned to the respective adaptor 110. Note that the DMA control circuit 116 can identify which transport packets to write to the host memory 120 by determining which descriptors have the processing completed status bits in the field 129-7 set, and the transport packet storage locations to which such descriptors point. Note that the DMA control circuit 116 may write data of descriptors and transport packets one by one as each is completed. Alternatively, the DMA control circuit 116 may allow a certain threshold number of transport packets and descriptors to accumulate. The DMA control circuit 116 then writes data of a sequence of i≧1 multiple completed descriptors and transport packets.

In one embodiment, a scrambler/descrambler circuit 115 is placed on the adaptor 110. In such a case, prior to the DMA control circuit 116 writing data of a transport packet to the host memory 120, the scrambler/descrambler circuit 115 descrambles each transport packet for which descrambling must be performed. This is described in greater detail below.

When the DMA control circuit 116 writes descriptor data and transport packets to the host memory 130, the DMA control circuit 116 interrupts the processor 160. Such interrupts may be initiated by the DMA control circuit 116 every i≧1 descriptors for which data is written to the host memory 130. The interrupt causes the processor 160 to execute one of the receipt PID handler subroutines for each transport packet which is both PID and input TS specific. As noted above, the receipt PID handler subroutines are selected by appropriate alteration of the pointers in the table 402 so that the processor 160, amongst other things, discards transport packets not to be outputted in the remultiplexed TS, writes an estimated departure time in the descriptors pointing to transport packets that are to be outputted and sets the PCR flag bit in the descriptors pointing to transport packets containing PCRs. In addition, the selected receipt PID handler subroutines preferably cause the processor 160 to continuously acquire and update the PSI tables, adjust the PID filter map and select additional receipt PID handler subroutines as necessary to effect a certain user specification. For example, a user specification can specify that a particular program number is to be continuously outputted in the remultiplexed TS TS3. However, the ESs that make up this program are subject to change due to, amongst other things, reaching an event boundary. Preferably, the processor 160 will detect such changes in ES make up by monitoring changes to the PAT and PMT and will change the PID filter map and select receipt PID handler subroutines as necessary to continuously cause the ESs of the selected program to be outputted in the remultiplexed TS TS3, whatever the make up of that program is from moment to moment.

Contemporaneously while performing the above functions associated with receiving transport packets, a DMA control circuit 116 and data control link circuit 112 on the third adaptor 110 also perform certain functions associated with transmitting transport packets in TS3. Each time the data link control circuit 112 of this third adaptor 110 outputs k≧1 transport packets, the data link control circuit 112 generates a transmit interrupt. Illustratively k may be selected by the processor 160. This transmit interrupt is received at the processor 160 which executes an appropriate transmit PID handler subroutine for the outputted remultiplexed TS TS3. In particular, the processor 160 examines the descriptors at the head of each queue that contains descriptors pointing to transport packets to be outputted in TS3. As noted above, two receipt queues contain descriptors pointing to transport packets to be outputted in TS3, including one receipt queue associated with the first adaptor 110 (that receives TS1) and one receipt queue associated with the second adaptor 110 (that receives TS2). As described below, the processor 160 may allocate additional queues containing descriptors pointing to transport packets to be outputted in TS3. The processor 160 identifies the descriptors pointing to the next j transport packets to be outputted in TS3. This is achieved by executing the transmit PID handler subroutines of the set associated with the third adaptor 110 and indexed by the PIDs of the transport packets in the head of the receipt queues. As noted above, if the transport packet corresponding to a descriptor in a queue examined by the processor 160 is not to be outputted from the third adaptor 110 (that generated the interrupt), the PID of this transport packet will index a transmit PID handler subroutine for the third adaptor 110 that does nothing. If the transport packet corresponding to the descriptor in the queue examined by the processor 160 is to be outputted from the third adaptor 110 (that generated the interrupt), the PID of the transport packet will index a pointer to a transmit PID handler subroutine that will: (1) allocate a transmit descriptor for the transport packet, (2) order the transmit descriptor in the transmit queue associated with the third adaptor 110 in the correct order for transmission, (3) assign an actual dispatch time to the allocated descriptor and transport packet and (4) perform a coarse PCR correction on the transport packet for drift and latency, if necessary. Illustratively, the processor 160 examines descriptors in (receipt) queues until j descriptors pointing to transport packets to be outputted in TS3 or from the third adaptor 110 are identified. The descriptors are examined in order from head 124-3 to tail 124-4. If multiple queues with candidate descriptors are available for examination, the processor 160 may examine the queues in a round-robin fashion, in order of estimated departure time or some other order that may be appropriate considering the content of the transport packets to which the descriptors point (as described below).

The DMA control circuit 116 retrieves from the host memory 120 data of a sequence of j≧1 descriptors of the queue associated with TS3 or the third adaptor 110. The descriptors are retrieved from the descriptor storage locations 129 of the queue in order from head pointer 124-3 to tail pointer 124-4. The DMA control circuit 116 also retrieves from the host memory 120 the transport packets from the transport packet storage locations of the pool 122 to which each such retrieved descriptor points. The DMA control circuit 116 stores such retrieved descriptors and transport packets in the cache 114.

The data link control circuit 112 sequentially retrieves from the cache 114 each descriptor in the transmit queue, in order from the head pointer 124-3, and the transport packet in the transport packet storage location to which the descriptor points. When the time of the reference clock generator 113 of the third adaptor 110 equals the time indicated in the dispatch time field 129-5 of the retrieved descriptor, the data link control circuit 112 transmits the transport packet, to which the descriptor (in the storage location pointed to by the head pointer 124-3) points, in TS3. The dispatch time is only the approximate transmit time because each transport packet must be transmitted in alignment with the transport packet time slot boundaries of TS3. Such boundaries are set with reference to an external clock not known to the processor 160. Note also, that the PCRs of each transport packet may be slightly jittered for the same reason. Accordingly, the data link control circuit 112 furthermore finally corrects the PCRs according to the precise transmit time of the transport packet that contains it. Specifically, the precise transmit time is less than a transport packet time off from the estimate. The data link control circuit 112 uses a transport time slot boundary clock, which is previously locked to the time slot boundaries of TS3, to make the final adjustment to the estimated PCRs (namely, by adding the difference between the dispatch time and the actual transmission time to the PCR of the transport packet). Note that the data link control circuit 112 can use the PCR flag bit of the descriptor to determine whether or not a PCR is present in the transport packet (and thus whether or not to correct it).

After transmitting a transport packet, the data link control circuit 112 sets the appropriate status information in field 129-7 of the descriptor that points to the transmitted transport packet and deallocates the descriptor. The DMA control circuit 116 then writes this status information into the appropriate descriptor storage location of the transmit queue.

In another manner of operation, the operator already has full knowledge of the contents of the inputted TSs to be remultiplexed. In this case, the operator simply prepares the user specification and transmits the user specification from the controller 20 to the remultiplexer node 100 (or remultiplexer nodes 100 when multiple nodes operate in concert in a network distributed remultiplexer 100). Preferably, different kinds of information regarding the content of the inputted to-be-remultiplexed TSs (such as the PAT, PMT, etc.) is nevertheless continuously acquired. This enables instantaneous reporting of the content to the operator (via the processor 160 and the controller 20), for example, to enable creation of a modified user specification and to dynamically adjust the remultiplexing according to the modified user specification without ceasing the input of to-be-remultiplexed TSs, the output of the remultiplexed TS or the remultiplexing processing of the remultiplexer 100 noted above.

In addition to the above basic remultiplexing functions, the remultiplexer node 100 can perform more advanced functions. These functions are described individually below.

Dynamic Remultiplexing and Program Specific Information Insertion

As noted above, the operator can use the controller 20 for generating a user specification specifying programs and ESs to retain or discard, programs or ESs to scramble or unscramble (or both), remapping of PIDs, etc. In addition, the processor 160 preferably continuously acquires content information (e.g., data of the PAT, PMT, CAT, NIT, ECM tables, etc.) This enables simply dynamic, real-time or "on the fly" modification of the user specification and seamless alteration of the remultiplexing according to the new user specification. Specifically, the operator can alter the user specification and cause the remultiplexer 30 to seamlessly switch to remultiplexing according to the new user specification. Nevertheless, the remultiplexer 30 ensures that each outputted remultiplexed TS is always a continuous bitstream containing an unbroken sequence or train of transport packets. Thus, the content of the outputted remultiplexed TS(s) are modified without introducing discontinuities into the outputted remultiplexed TS(s), i.e., no breaks in the train of outputted transport packets, or stoppages in the outputted bit stream, occur.

The above seamless modifications can be affected due to the use of a programmable processor 160 which controls the flow of transport packets between input and output adaptors 110 or interfaces 140 and 150 and other circuits such as the descrambler/scrambler 170. Consider that choosing to retain or discard a different set of ESs can be effected simply by the processor 160 adjusting the appropriate PID filter maps and PID handler subroutines selected by the processor 160 for each PID. Choosing whether to descramble or scramble certain ESs or programs can be achieved by the processor 160 altering the PID handler subroutines executed in response to the PIDs assigned to such ESs or programs to include the appropriate scrambling or descrambling processes (described above and below). A different selection of output ports for outputting a different combination of outputted remultiplexed TSs can be achieved by the processor 160 allocating transmit descriptor queues for the new output ports, deallocating transmit descriptor queues for unneeded output ports, generating tables 404 of pointers to transmit PID handler subroutines for each new output port and discarding each table 404 of pointers to transmit PID handler subroutines for each deallocated transmit queue. In a like fashion, a different selection of input ports may be achieved by the processor 160 allocating and deallocating receipt queues and generating and discarding tables 402 of pointers to receipt PID handlers for such allocated and deallocated receipt queues, respectively.

In addition to selecting the correct transport packets for output, the remultiplexer node 100 illustratively also provides the correct PSI for each outputted remultiplexed TS. This is achieved as follows. The controller 20 (FIG. 2) generates a user specification for the output TS. Consider the above example where the remultiplexer node 100 remultiplexes two TSs, namely, TS1 and TS2 to produce a third TS, namely, TS3. Illustratively, Table 1 sets forth the contents of each of TS1 and TS2.

TABLE 1

| | TS1 | | | TS2 | |
|---|---|---|---|---|---|
| Program | ES | PID | Program | ES | PID |
| A | Video A | PID(VA) | E | Video E | PID(VE) |
| A | Audio A | PID(AA) | E | Audio E | PID(AE) |
| A | Data A | PID(DA) | PMT | Prog. Def. E | PID(e) |
| PMT | Prog. Def. A | PID(a) | F | Video F | PID(VF) |
| B | Video B | PID(VB) | F | Audio F | PID(AF) |
| B | Audio B | PID(AB) | F | Data F | PID(DF) |
| PMT | Prog. Def. B | PID(b) | PMT | Prog. Def. F | PID(f) |
| C | Video C | PID(VC) | G | Video G | PID(VG) |
| C | Audio C | PID(AC) | G | Audio 1 G | PID(A1G) |
| C | Decrypt C | PID(ECMC) | G | Audio 2 G | PID(A2G) |
| PMT | Prog. Def. C | PID(c) | G | Data G | PID(DG) |
| D | Video D | PID(VD) | G | Decrypt G | PID(ECMG) |
| D | Audio 1 D | PID(A1D) | PMT | Prog. Def. G | PID(g) |
| D | Audio 2 D | PID(A2D) | PAT | PAT2 | 0x0000 |
| D | Data D | PID(DD) | | | |
| PMT | Prog. Def. D | PID(d) | | | |
| PAT | PAT 1 | 0x0000 | | | |

Preferably, the controller 20 programs the processor 160 to extract the information shown in Table 1 using the acquisition process of receive PID handler subroutines described above.

Suppose the user specification specifies that only programs A, B, F and G should be retained and outputted into a remultiplexed outputted TS TS3. The user indicates this specification at the controller 20 (FIG. 1), e.g., using the keyboard/mouse 27 (FIG. 1). The controller 20 determines whether or not the user specification is valid. In particular, the controller 20 determines whether or not each output remultiplexed TS, such as TS3, has sufficient bandwidth to output all of the specified programs A, B, F and G and associated PSI (i.e., program definitions a, b, f, g and new, substitute PAT3 to be described below). Such bit rate information can be obtained from the processor 160 if not already known. For example, the processor can execute a PID handler subroutine that determines the bit rate (or transport packet rate) of each program from receipt time stamps assigned to each transport packet of each program bearing a PCR. As described above, such information is obtained anyway by the processor 160 for purposes of performing PCR adjustment. If the user specification is not valid, the controller 20 does not download the user specification. If the specification is valid, the controller 20 downloads the user specification to the processor 160.

Assume that the user specification can be satisfied by the output bandwidth of TS3. If not already acquired, the processor 160 acquires the PAT and PMT of the inputted TSs TS1 and TS2. Based on the information in PAT1 and PAT2, the processor 160 constructs a substitute PAT3 including only the entries of PAT1 and PAT2 indicating the PIDs of program definitions a, b, f and g associated with programs A, B, F and G. Again, this may be achieved using an appropriate PID handler subroutine for the PIDs of PAT1 and PAT2 and is preferably executed continuously to ensure that any changes to the programs, as reflected in PAT1 and PAT2, are incorporated into the substitute PAT3. The processor 160 generates a sequence of transport packets containing this new substitute PAT3 and stores them in the packet buffer 122. The processor 160 also generates a PAT queue of descriptors pointing to the transport packets bearing PAT3, which queue preferably is implemented as a ring 124. The PAT descriptor queue for the PAT3 transport packets advantageously is dedicated to storing only substitute PAT information. The processor 160 furthermore generates estimated departure times and stores them in the descriptors of the PAT queue that point to the PAT3 transport packets.

The processor 160 can now service the PAT3 descriptor queue in the same way as any of the receipt queues in response to a transmit interrupt. That is, when the data link control circuit 112 transmits k≧1 packets and interrupts the processor 160, the processor 160 will extract descriptors from the PAT3 queue as well as the receipt queues. Collectively, all queues containing descriptors pointing to to-be-outputted transport packets, for which transmit descriptors in a transmit queue have not yet been allocated are referred to herein as "connection queues."

The processor 160 then constructs appropriate filter maps and transfers one filter map to a first adaptor 110 that receives TS1 and a second filter map to a second adaptor 110 that receives TS2, respectively. For example, the first filter map may indicate to extract and retain transport packets with the PIDs: PID(VA), PID(AA), PID(DA), PID(a), PID(VB), PID(AB) and PID(b) (as well as possibly other PIDs corresponding to PSI in TS1). Likewise, the second filter map may indicate to extract and retain transport packets with the PIDs: PID)(VF), PID(AF), PID(DF), PID(f), PID(VG), PID(A1G), PID(A2G), PID(DG), PID(ECMG) and PID(g) (as well as possibly other PIDs corresponding to PSI in TS2). In response, the first and second data link control circuits 112 receiving TS1 and TS2, extract only those transport packets from TS1 and TS2 according to the filter maps provided by the processor 160. As noted above, the first and second data link control circuits 112 store such extracted packets in a cache 114 and allocate descriptors therefor. First and second DMA control circuits 116 periodically write the extracted transport packets and data of descriptors therefor to the host memory 120. The data of the descriptors written by the first DMA control circuit 116 is stored in respective descriptor storage locations 129 of a first receive queue for the first data link control circuit 112 and the data of the descriptors written by the second DMA control circuit 116 is stored in descriptor storage locations of a second receive queue for the second data link control circuit 112.

In addition, a third DMA control circuit 116 retrieves descriptors from a transmit queue associated with TS3, and transport packets corresponding thereto, and stores them in a cache 114. A third data link control circuit 112 retrieves each descriptor from the cache 114 and transmits them in TS3. The third data link control circuit 112 generates an interrupt after transmitting k≧1 transport packets. This causes the processor 160 to access the table of pointers to transmit PID handler subroutines for the transmit queue associated with the third data link control circuit 112. In executing the appropriate transmit PID handler subroutine, the processor 160 allocates unused transmit descriptors of the TS3 transmit queue for, and copies pertinent information in such allocated descriptors from, descriptors in available connection queues, namely, the first receive queue, the second receive queue and the PAT3 queue. The transmit descriptors are allocated in the TS3 transmit queue in an order that depends on the estimated dispatch time of the receipt descriptors.

Note also that any kind of PSI may be dynamically inserted, including new program definitions, EMMs, ECMs, a CAT or an NIT.

Consider now a situation where a new user specification is generated while remultiplexing occurs according to a previous user specification. As before, the controller 20 initially verifies that there is sufficient bandwidth to meet the new user specification. If there is, the new user specification is down loaded to the processor 160. The new user specification may require that the processor 160 extract different programs and ESs, map PIDs differently, or generate: (a) new PSI, (b) transport packets bearing the new PSI, and (c) descriptors pointing to the transport packets bearing the new PSI. In the case of modifying the programs or ESs contained in TS3, the processor 160 modifies the PID filter maps to retain the to-be-retained transport packets and to discard the to-be-discarded transport packets according to the new user specification. The new filter maps are transferred to the respective caches 114 which dynamically and immediately switch to extracting transport packets according to the new user specification. The processor 160 also selects appropriate receipt PID handler subroutines for the new to-be-retained transport packets by modifying the pointers of the receipt PID handler subroutine pointer tables 402 associated with the PIDs of the new, to-be-retained transport packets. Modifications may also be made to pointers of the receipt PID handler subroutine pointer tables 402 indexed by PIDs of transport packets now to-be-discarded. In the case of a new PID remapping, the processor 160 selects appropriate subroutines to perform the new PID remapping.

Such changes may require the generation of new PSI, e.g., a new PAT. The processor 160 selects an appropriate PID handler subroutine for generating the new PSI. For example, in the case of a new PAT, the PID handler subroutines may be triggered by the PIDs of the PATs of TS1 and TS2. The processor 160 generates new PSI and inserts the new PSI into transport packets. Descriptors in a respective PSI queue are allocated for such new PSI transport packets. The processor 160 stops servicing (i.e., refreshing and transferring transport packets from) any PSI descriptor queues pointing to transport packets containing stale PSI and instead services the new PSI descriptor queues.

As each change, i.e., each newly selected PID handler subroutine, each PSI insertion modification or each new PID filter map, is available, the appropriate data link control circuit 112 or processor 160 seamlessly changes its operation. Until such change is effected, the data link control circuit 112 or processor 160 continues to operate under the previous user specification. Some care must be taken in ordering when each change occurs so that the outputted remultiplexed TS is always MPEG-2 compliant. For example, any changes to PID mapping, PID filtering, programs, ESs, ECMs, etc., in the TS, which impact the PMT or PAT are preferably delayed until a new version of the PMT (or specific program definitions thereof) and/or PAT can be outputted in the TS and an indication for switching over to the new PMT, program definition or PAT is indicated in the TS. Likewise, if EMMs are included or dropped for a conditional access system, the introduction of such EMMs is delayed until a new version of the CAT can be transmitted in the TS. Additional judicious ordering of changes may be desirable for internal processing management of resources, such as storing a pointer to a receipt PID handler subroutine in the appropriate receipt PID handler subroutine pointer table entry indexed by a PID of a transport packet to-be retained (that was previously discarded) prior to altering the PID filter map of the respective adaptor 110 for retaining transport packets with this PID, etc.

The following is an example of modifying the remultiplexing according to a new user specification. Suppose the user provides a new user specification indicating that programs B and F should be dropped and instead, programs C and D should be retained. In response, the controller 20 first determines if there is sufficient bandwidth in the outputted remultiplexed TS TS3 to accommodate all of the new program data, and new PSI that must be generated therefor, in modifying the remultiplexed TS TS3 according to the new user specification. Assuming that there is, the new user specification is downloaded to the remultiplexer node 100. The processor 160 modifies the PID filter map in the first adaptor 110 so as to discard transport packets with PIDs PID(VB), PID(AB), PID(b) and retain transport packets with PID PID(VC), PID(AC), PID(ECMC), PID(c), PID (VD), PID(A1D), PID(A2D), PID(DD) and PID(d). Likewise, the processor 160 modifies the PID filter map in the second adaptor 110 so as to discard transport packets with PIDs PID(VF), PID(AF), PID(DF), and PID(f). The processor 160 selects PID handler subroutines for the PIDs PID(VC), PID(AC), PID(ECMC), PID(c), PID(VD), PID (A1D), PID(A2D), PID(DD) and PID(d), including program definition update processes for each of PIDs PID(c) and PID(d), a control word update process for PID(ECMC), a descrambling control word information insertion process for each of the scrambled ESs of program C, e.g., PID(VC). The processor 160 also generates a different substitute PAT3 including the program definitions a, b, c, d, and g, e.g., in the course of executing PID handler subroutines for PID(0) for each of the first and second adaptors 110.

Now consider the case where another new user specification is provided indicating that the VA video ES of program A should be scrambled. Again, the controller 20 first determines if there is sufficient bandwidth in TS3 to accommodate ECM bearing transport packets for VA and new program definitions for program A. Assuming that there is, the new user specification is downloaded to the remultiplexer node 100. The processor 160 allocates a queue for storing descriptors pointing to transport packets containing the ECMs of VA. The processor 160 selects an appropriate PID handler subroutine for PID(VA) including inserting a scrambling control word into the descriptors pointing to transport packets containing VA. The processor 160 also generates transport packets containing the control words as ECMs for VA and allocates descriptors pointing to these transport packets. This may be achieved using a timer driven interrupt handler subroutine. Alternatively, additional hardware (nor shown) or software executed by the processor 160 generates control words periodically and interrupts the processor 160 when such control words are ready. The processor 160 responds to such interrupts by placing an available control word in one or more transport packets, allocating ECM descriptors of an ECM queue for such transport packets, and loading the new control word into the appropriate control word table. The processor 160 furthermore selects a receive PID handler subroutine for PID(a) including a process that extracts the information in the program definition a and adds information regarding ECMA (e.g., PID(ECMA), the ES that it encrypts, etc.).

Scrambling/Descrambling Control

One problem associated with scrambling and descrambling is the selection of the correct control word or key for each transport packet. That is, scrambled transport packet data may be scrambled with a PID specific control word or a control word specific to a group of PIDs. A rotating control word scheme may be used where the control word changes from time to time. In short, there may be a large number of control words (e.g., keys) associated with each TS and control words are periodically changed. In the case of descrambling, a mechanism must be provided for continuously receiving control words for each to-be-descrambled ES or group of ESs and for selecting the appropriate control word at each moment of time. In the case of scrambling, a mechanism must be provided for selecting the correct control word for scrambling an ES or group of ESs and for inserting the control word used for scrambling the ESs into the outputted remultiplexed TS sufficiently in advance of any scrambled ES data thereby formed.

The descriptors and their ordering within the receipt and transmit queues can be used to simplify the scrambling and descrambling of TSs. In particular, each receipt descriptor has a field 129-9 in which information pertinent to scrambling or descrambling can be stored, such as the control word to be used in scrambling the transport packet or a pointer to the appropriate control word table containing control words for use in scrambling or descrambling the transport packet.

Consider first the steps performed in descrambling a transport packet. The TS containing transport packets to be descrambled contains ECM (ES specific conditional access) and EMM (conditional access specific to a whole group of ESs) bearing transport packets. EMMs are carried in transport packets labeled with PIDs unique to the group of ESs to which they correspond and ECMs are carried in transport packets labeled with PIDs unique to the specific ES to which each ECM corresponds. The PIDs of the EMMs can be correlated to the specific groups of ESs to which they correspond by reference to the CAT. The PIDs of the ECMs can be correlated to each specific ES to which they correspond by reference to the PMT. The processor 160 selects PID handler subroutines for:

(1) recovering each (PAT and PMT transmitted in the TS and for identifying which version of the CAT or PMT is currently being used, (2) by reference to the PMT, recovering a table of ECMs indexed by the PIDs of the transport packets carrying the ESs to which they correspond.

Next, the processor 160 defines a sequence of processing steps to be performed on each transport packet and descriptor. That is, the processor 160 defines the specific order in which the receipt adaptor 110 data link control circuit 112, the (optional) receipt adaptor 110 descrambler 115, the receipt adaptor 110 DMA control circuit 116, the (optional) descrambler 170 and the processor 160 can process a receipt descriptor or packet to which a receipt descriptor points. To this end, the processor 160 may transfer appropriate control information to each of the devices 112, 115 and 116 for causing them to process the transport packet and descriptor that points thereto in the specific order of the defined sequence of processing steps as described below.

If the on adaptor 110 descrambler 115 is used, the order of processing in the sequence is defined as follows. The data link control circuit 112 of an adaptor 110 receives transport packets and allocates receipt descriptors for selected ones of those transport packets not discarded as per the PID filter map described above. After storing each retained transport packet in the cache 114, the data link control circuit 112 illustratively sets the status bit(s) 129-7 in the descriptor pointing to the transport packet to indicate that the transport packet may now be processed by the next device according to the order of the defined sequence of processing steps.

The descrambler 115 periodically examines the cache 114 for the next one or more descriptors for which the status bit(s) 129-7 are set to indicate that the descrambler 115 has permission to modify the transport packet. Illustratively, the descrambler 115 accesses the cache 114 after the descrambler 115 has processed m≧1 descriptors. The descrambler 115 accesses each descriptor of the cache 114 sequentially from the descriptor previously accessed by the descrambler 115 until m≧1 descriptors are accessed or until a descriptor is reached having the status bit(s) 129-7 set to indicate that processing of a previous step is being performed on the descriptor and transport packet to which it points according to the order of the defined sequence of processing steps.

In processing descriptors and transport packets, the descrambler 115 uses the PID of the transport packet, to which the currently examined descriptor points, to index a descrambling map located in the cache 114. Illustratively, the processor 160 periodically updates the descrambling map in the cache 114 as described below. The location of the descrambling map is provided by a base address located in the descriptor field 129-9. Illustratively, the processor 160 loads the base address of the descrambling map into the fields 129-9 of each descriptor when allocating the receipt descriptor queues. The indexed entry of the descrambling map indicates whether or not the transport packet is scrambled and, if scrambled, one or more control words that can be used to descramble the transport packet. The indexed entry of the descrambling map can contain the control words corresponding to the PID of the transport packet or a pointer to a memory location in which the respective control word is stored. If the indexed entry of the descrambling map indicates that the transport packet to which the accessed descriptor points is not to be descrambled, the descrambler 115 simply sets the status bit(s) 129-7 of the descriptor to indicate that the next processing step, according to the order of the defined sequence of processing steps, may be performed on the descriptor and transport packet to which it points.

If the indexed entry of the descrambling map indicates that the transport packet is to be descrambled, the descrambler 115 obtains the control word corresponding to the PID of the transport packet and descrambles the transport packet data using the control word. Note that a typical descrambling scheme uses rotating (i.e., odd and even) control words as described above. The correct odd or even control word to use in descrambling a transport packet is indicated by control bits in the transport packet, such as the transport_scrambling_control bits. The descrambler 115 uses these bits, as well as the PID of the transport packet, in indexing the correct control word. That is, the map constructed and maintained by the processor 160 is indexed by both the PID and the odd/even indicator(s). The descrambler 115 then stores the descrambled transport packet data in the transport packet storage location pointed to by the currently examined descriptor thereby overwriting the pre-descrambling data of the transport packet. The descrambler 115 then sets the status bit(s) 129-7 of the descriptor to indicate that the next processing step according to the order of the defined sequence of processing steps may be performed on the descriptor and transport packet to which it points.

The DMA control circuit 116 periodically writes transport packet data and data of descriptors that point thereto from the cache 114 to respective storage locations 122 and 129 of the host memory 130. In so doing, the DMA control circuit 116 periodically examines a sequence of one or more descriptors in the cache 114 that follow (in receipt queue order) the last descriptor processed by the DMA control circuit 116. If the status bit(s) 129-7 of an examined descriptor indicates that processing by the DMA control circuit 116 may be performed on the examined descriptor, the DMA control circuit 116 sets an appropriate status bit(s) 129-7 in the descriptor indicating that the next step of processing, according to the order of the defined sequence of processing steps, may be performed on the descriptor and the transport packet to which it points. The DMA control circuit 116 then writes the data of the descriptor, and of the transport packet to which it points, to the host memory 130. However, if the status bit(s) 129-7 are set to indicate that a processing step that precedes the processing performed by the DMA control circuit 116 is still being performed on the descriptor, the DMA control circuit 116 refrains from processing the descriptor and transport packet to which it points. Illustratively, when enabled, the DMA control circuit 116 examines descriptors until the DMA control circuit 116 writes data of a sequence of i≧1 descriptors, and transport packets to which such descriptors point, or a descriptor is encountered having status bit(s) 129-7 indicating that a prior processing step, according to the order of the defined sequence of processing steps, is still being performed on the descriptor. Each time the DMA control circuit 116 transfers i≧1 transport packets, the DMA control circuit issues an interrupt.

The processor 160 responds to the interrupt issued by, for example, the DMA control circuit 116, by executing the appropriate receipt PID handler subroutine. The processor 160 examines one or more descriptors of the receipt queue, corresponding to the adaptor 110 from which the interrupt was received, starting from the last descriptor processed by the processor 160. Illustratively, the processor 160 only executes the appropriate receipt PID handler subroutine for those descriptors having a status bit(s) 129-7 set indicating that processing by the processor 160 may be performed on the descriptor. Each time the processor 160 is interrupted, the processor 160 illustratively processes descriptors, and transport packets to which they point, until PID handler subroutines are executed for $i \geq 1$ transport packets or until a descriptor is encountered for which the appropriate status bit(s) 129-7 is set to indicate that processing of a prior processing step (according to the order of the defined sequence of processing steps) is still being performed on the descriptor.

In the course of executing the appropriate receipt PID handler subroutines, the processor 160 recovers all control words for all ESs and updates the descrambling and control word tables or maps used by the descrambler 115 (or 170 as described below). In a rotating control word scheme, the processor 160 maintains multiple (i.e., odd and even) keys for each PID in the control word table or map. The processor 160 may also perform processing for enabling subsequent scrambling of descrambled transport packets (described below). After processing the receipt descriptors, the processor 160 deallocates them by setting their status bit(s) 129-7 to indicate that the descriptor is invalid (and thus the data link control circuit 112 is the next device to process the descriptors), erasing or resetting selected fields of the descriptor and advancing the head pointer 124-3 to the next descriptor storage location 129.

Consider now the case where the descrambler 115 is not provided on the adaptor 110 or not used. Instead, a descrambler 170 resident on the bus 130 is used. A very similar procedure is carried out as before. However, in this scenario, the order of processing steps of the defined sequence is changed so that the DMA control circuit 116 processes the descriptors (and their corresponding transport packets) after the data link control circuit and before the descrambler and the descrambler 170 processes the descriptors (and their corresponding transport packets) after the DMA control circuit 116 but before the processor 160. Thus, after the data link control circuit 112 allocates a descriptor for a transport packet and sets the appropriate status bit(s) 129-7 to enable the next step of processing to be performed thereon, the DMA control circuit 116 processes the descriptor and transport packet to which it points. As noted above, the DMA control circuit 116, sets the status bit(s) 129-7 to indicate that the next step of processing may be performed on the descriptor and writes the transport packet and descriptor to the host memory 130.

The descrambler 170 periodically examines the descriptors in the receipt queue to identify descriptors that have the status bit(s) 129-7 set to indicate that descrambling processing may be performed on descriptors and transport packets to which they point (according to the order of the defined sequence of processing steps). The descrambler 170 processes such identified transport packets in a similar fashion as discussed above for the descrambler 115. After processing the transport packets, the descrambler 170 sets one or more status bit(s) 129-7 to indicate that the next processing step (according to the order of the defined sequence of processing steps) can now be performed on the descriptor and transport packet to which it points.

The processor 160 performs the above noted processing in response to the interrupt issued by the DMA control circuit 116, including executing the appropriate receipt PID handler subroutine. Preferably, the queue length of the receipt queue associated with the adaptor 110 that interrupted the processor 160 is sufficiently long relative to the processing time of the descrambler 170 such that the processor 160 examines and processes descriptors that the descrambler 170 had already completed processing. In other words, the processor 160 and descrambler 170 preferably do not attempt to access the same descriptors simultaneously. Rather, the processor 160 begins to process descriptors at a different point in the receipt queue as the descrambler 170.

Consider now the processing associated with scrambling. As with descrambling processing, status bit(s) 129-7 in the descriptor are used to order the processing steps performed on each descriptor and transport packet to which such descriptors point according to an order of a defined sequence of processing steps. Unlike descrambling, scrambling is preferably performed after the processor 160 has allocated transmit descriptors to the to-be-scrambled transport packets. As such, the control word field 129-9 can be used in one of two ways. As in descrambling, an address to the base of a scrambling map may be placed in the control word descriptor field 129-9. Preferably, however, because scrambling occurs after the processor 160 processes the descriptors in the transmit queue, the correct control word, itself, is placed into the control word descriptor field 129-9.

Consider first the scrambling processing wherein scrambling is performed by an on transmit adaptor 110 scrambler 115. The processor 160 obtains ECM transport packets containing control words that are preferably encrypted. These ECM transport packets are enqueued in a respective corresponding connection queue and are scheduled for output at the correct time. That is, the ECM transport packets are scheduled for injection into the outputted TS sufficiently in advance of the transport packets that they descramble to enable a decoder to recover the control word prior to receiving the transport packets that it descrambles.

At an appropriate time after transmitting the ECM transport packets containing a control word, the processor 160 changes the control word table to cause data to be encrypted using a new key corresponding to the recently transmitted control word. As transport packets are transmitted from an output adaptor, the processor 160 executes transmit PID handler subroutines associated with the PIDs of the transport packets pointed to by descriptors in examined connection queues. For each such to-be-scrambled transport packet, the transmit PID handler subroutine includes a process for inserting control word information into the descriptor associated with the transport packet. The control word information may simply be the base address of a scrambling map to be used in identifying the control word for use in scrambling the transport packet. However, the control word information can also be the correct control word to be used in scrambling the transport packet. The processor 160 may also toggle bits in the transport packet, such as the transport_scrambling_control bits, to indicate which of the most recently transmitted control words should be used to decrypt or descramble the transport packet at the decoder. The processor 160 furthermore illustratively sets one or more status bits 129-7 of the newly allocated transmit descriptor to indicate that the next processing step (according to the order of the defined sequence of processing steps) should be performed on the transmit descriptor and the transport packet to which it points.

The DMA control circuit 116 of the transmit adaptor 110 periodically retrieves descriptor data from the transmit queue and transport packets to which such descriptors point. In so doing, the DMA control circuit 116 examines the descriptors in the transmit queue following the last descriptor for which the DMA control circuit 116 transferred descriptor data to the cache 114. The DMA control circuit 116 only transfers data of transmit descriptors for which the status bit(s) 129-7 are set to indicate that processing by the DMA control circuit 116 may now be performed (according to the order of the defined sequence of processing steps). For example, the DMA control circuit 116 may examine transmit descriptors until a certain number k≧1 of transmit descriptors are identified which the DMA control circuit 116 has permission to process or until a descriptor is identified having status bits 129-7 set to indicate that a previous processing step is still being performed on the transmit descriptor and transport packet to which it points. After transferring to the cache 114 data of such transmit descriptors, and the transport packets to which such transmit descriptors point, the DMA control circuit 116 sets the status bit(s) 129-7 of such transferred transmit descriptors to indicate that the next processing step (according to the order of the defined sequence of processing steps) may be performed on the transmit descriptors, and the transport packets to which they point.

Next, the scrambler 115 periodically examines the descriptors in the cache 114 for a sequence of one or more descriptors, and transport packets to which they point, to process. The scrambler 115 only processes those accessed descriptors having one or more status bits 129-7 set to indicate that the scrambling processing step may be performed thereon (according to the order of the defined sequence of processing steps). The scrambler 115 accesses the control word information field 129-9 and uses the information therein to scramble each to-be-scrambled transport packet. As noted above, the control word information can be used one of two ways. If the control word information is a base address to a scrambling map, the scrambler 115 uses the base address and PID information of the transport packet to index the scrambling map. The indexed entry of the scrambling map indicates whether or not the transport packet is to be scrambled, and if so, a control word to use in scrambling the transport packet. Alternatively, the control word information in the field 129-9, itself, indicates whether or not the transport packet is to be scrambled, and if so, the control word to use in scrambling the transport packet. If the transport packet of the processed descriptor is not to be scrambled, the scrambler 115 simply sets the appropriate status bit(s) 129-7 to indicate that the next processing step (according to the order of the defined sequence of processing steps) may now be performed on the transmit descriptor and the transport packet to which it points. If the transport packet of the processed descriptor is to be scrambled, the scrambler scrambles the transport packet data first, stores the transport packet in the cache in place of the unscrambled transport packet and then sets the appropriate status bit(s) 129-7.

The data link control circuit 112 periodically examines the transmit descriptors in the cache 114 for transmit descriptors having one or more status bits 129-7 set to indicate that processing by the data link control circuit 112 may be performed thereon. For such transmit descriptors, the data link control circuit 112 transmits the transport packets to which such descriptors point, at approximately the actual dispatch time indicated therein. The data link control circuit 112 then deallocates the descriptors (and sets the status bits 129-7 to invalid). Illustratively, each time the data link control circuit 112 transmits a sequence of k≧1 descriptors, the data link control circuit 112 generates a transmit interrupt for receipt by the processor 160.

In the case that the scrambler 115 is not present or is not used, the scrambler 170 illustratively is used instead. The sequence of processing steps set forth above is changed so that the scrambler 170 processes each transmit descriptor and transport packet to which it points after the processor 160 and before the DMA control circuit 116 and the DMA control circuit 116 processes each transmit descriptor the transport packet to which it points after the scrambler 170 but before the data link control circuit 110.

Bandwidth Optimization

As noted above, often a program bearing TS has null transport packets inserted therein. Such null transport packets are present because excess bandwidth typically must be allocated for each program by the program encoder. This is because the amount of encoded data produced for each ES produced from moment to moment can only be controlled so much. Absent this "overhead bandwidth" encoded ES data would frequently exceed the amount of bandwidth allocated thereto causing encoded ES data to be omitted from the TS. Alternatively, an ES encoder, especially a video ES encoder, might not always have data available to output when a transport packet time slot occurs. For example, a particular picture may take an unexpectedly longer time to encode than previously anticipated, thereby causing a delay in production of encoded video ES data. Such time slots are filled with null transport packets.

Although the presence of null transport packets must be tolerated in the remultiplexer node 100, it is desirable to reduce the number of such bandwidth wasting null transport packets. However, in so doing, the bit rate of each program should not be varied and the end-to-end delay should remain constant for such programs. According to one embodiment, a technique is employed whereby null transport packets are replaced with other to-be-remultiplexed transport packet data, if such other transport packet data is available. This is achieved as follows.

First consider that the processor 160 can have multiple connection queues on hand containing descriptors of to-be-scheduled transport packets, i.e., descriptors in receipt queues, PSI queues, other data queues, etc., not yet transferred to a transmit queue. As noted above, these descriptors may point to transport packets associated with a received incoming TS or to other program related streams generated by the processor 160, such as a PAT stream, a PMT stream, an EMM stream, an ECM stream, a NIT stream, a CAT stream, etc. However, other kinds of to-be-scheduled transport packets and descriptors 129 therefor may be on hand such as non-time sensitive, "bursty" or "best effort" private data bearing transport packets. For example, such extra transport packets may contain transactional computer data, e.g., such as data communicated between a web browser and a web server. (The remultiplexer node 100 may be a server, a terminal or simply an intermediate node in a communication system connected to the "internet." Such a connection to the internet can be achieved using a modem, the adaptor 140 or 150, etc.) Such data does not have a constant end-to-end delay requirement. Rather, such data may be transmitted in bursts whenever there is bandwidth available.

The processor 160 first causes each null transport packet to be discarded. This can be achieved by the processor 160 using a receive PID handler subroutine which discards all null transport packets. This technique illustratively is used when the null transport packets are received from a device other than the adaptor 110, such as the interface 140 or 150. Alternatively, if the null transpot packets are received from the adaptor 110, the processor 160 may provide a PID filter map to the data link control circuit 112 which causes each null transport packet to be discarded. Next, according to the receive PID handler subroutine, each incoming transport packet that is to be outputted in the TS is assigned an estimated departure time as a function of the receipt time of the transport packet (recorded in the descriptor therefor) and an internal buffering delay within the remultiplexer node 100. In each respective connection queue containing to-be-scheduled transport packets, the assigned departure times might not be successive transport packet transmission times (corresponding to adjacent time slots) of the outputted TS. Rather, two successive descriptors for transport packets to be outputted in the same output TS may have estimated departure times that are separated by one or more transport packet transmission times (or time slots) of the outputted remultiplexed TS in which the transport packets are to be transmitted.

Preferably, descriptors pointing to program data bearing transport packets, descriptors pointing to PSI, ECM or EMM bearing transport packets and descriptors pointing to bursty data are each maintained in mutually separate connection queues. In implementation, connection queues are each assigned a servicing priority depending on the type of data in the transport packets to which the descriptors enqueued therein point. Preferably, program data received from outside the remultiplexer node (e.g., via a receipt adaptor 110 or an interface 140 or 150) is assigned the highest priority. Connection queues storing PSI, ECM or EMM streams generated by the remultiplexer node 100 may also be assigned the same priority. Finally, connection queues with descriptors pointing to transport packets containing bursty data with no specific continuity, propagation delay or bit rate requirement, are assigned the lowest priority. In addition, unlike program, PSI, ECM and EMM data, no estimated departure time is assigned to, or recorded in the descriptor of, transport packets bearing bursty data.

In executing transmit PID handler subroutines, the processor 160 transfers descriptors associated with to-be-scheduled transport packets from their respective connection queues to a transmit queue. In so doing, the processor 160 preferably services (i.e., examines the descriptors in) each connection queue of a given priority before resorting to servicing connection queues of a lower priority. In examining descriptors, the processor 160 determines whether or not any examined descriptors of the high priority connection queues (i.e., containing descriptors of transport packets bearing program PSI, ECM or EMM data) point to transport packets that must be transmitted at the next actual dispatch time, based on the estimated departure time assigned to such transport packets. If so, the processor 160 allocates a transmit descriptor for each such transport packet, copies pertinent information from the connection queue descriptor into the allocated transmit queue descriptor and assigns the appropriate dispatch times to each transport packet for which a transmit descriptor is allocated. As noted above, occasionally two or more transport packets contend for the same actual departure time (i.e., the same transport packet time slot of the outputted remultiplexed TS) in which case, a sequence of transport packets are assigned to consecutive time slots and actual departure times. PCR adjustment for such transport packets is performed, if necessary.

At other times, when the processor 160 services the connection queues, no transport packet of the higher priority connection queues has an estimated departure time that would cause the processor 160 to assign that transport packet to the next available time slot and actual dispatch time of the outputted remultiplexed TS. Ordinarily, this would create a vacant time slot of the outputted remultiplexed TS. Preferably, however, in this situation, the processor 160 services the lower priority connection queues.

The processor 160 examines the lower priority connection queues (in order from the head pointer 124-3), selectively assigns a transmit descriptor to each of a sequence of one or more transport packets, to which such examined descriptors point, and copies pertinent information of the examined descriptors to the allocated transmit descriptors. The processor 160 selectively assigns one of the (otherwise) vacant time slots to each transport packet to which such examined descriptors point and stores the actual dispatch time associated with the assigned time slots in the corresponding allocated transmit descriptors.

Occasionally, no transport packets, pointed to by descriptors in a high or low priority connection queue, can be assigned to a time slot of the outputted remultiplexed TS. This can occur because no high priority transport packets have estimated departure times corresponding to the actual dispatch time of the time slot and no bursty data bearing transport packets are buffered pending transmission at the remultiplexer node 100. Alternatively, bursty data bearing transport packets are buffered, but the processor 160 chooses not to assign transmit descriptors therefor at this particular moment of time for reasons discussed below. In such a case, the descriptors in the transmit queue will have actual transmit times corresponding to a non-continuous sequence of transport packet time slots of the outputted remultiplexed TS. When the data link control circuit 112 of the transmit adaptor 110 encounters such a discontinuity, the data link control circuit 112 transmits a null transport packet at each vacant time slot to which no transport packet is assigned (by virtue of the transmit descriptor actual dispatch time). For example, assume that the dispatch times of two successive descriptors in the transmit queue associated with first and second transport packets indicate that the first transport packet is to be transmitted at a first transport packet time slot and that the second transport packet is to be transmitted at a sixth transport packet time slot. The data link control circuit 112 transmits the first transport packet at the first transport packet time slot. At each of the second, third, fourth, and fifth transport packet time slots, the data link control circuit 112 automatically transmits a null transport packet. At the sixth transport packet time slot, the data link control circuit 112 transmits the second transport packet.

Note that bursty or best effort data typically does not have a rigorous receive buffer constraint. That is, most bursty or best effort data receivers and receiver applications specify no maximum buffer size, data fill rate, etc. Instead, a transport protocol, such as transmit control protocol (TCP) may be employed whereby when a receiver buffer fills, the receiver simply discards subsequently received data. The receiver does not acknowledge receiving the discarded packets and the source retransmits the packets bearing the data not acknowledged as received. This effectively throttles the effective data transmission rate to the receiver. While such a throttling technique might effectively achieve the correct data transmission rate to the receiver it has two problems. First, the network must support two-way communication. Only a fraction of all cable television networks and no direct broadcast satellite networks support two-way communication between the transmitter and receiver (absent a telephone return path). In any event, where two-way communication is supported, the return path from the receiver to the transmitter has substantially less bandwidth than the forward path from the transmitter to the receiver and often must be shared amongst multiple receivers. Thus, an aggressive use of TCP as a throttling mechanism utilizes a large fraction of the return path which must also be used for other receiver to transmitter communications. Moreover, it is undesirable to waste bandwidth of the forward path for transmitting transport packets that are discarded.

Preferably, the insertion of bursty or best effort data should not cause such buffers to overflow. Illustratively, the PID handler subroutine(s) can control the rate of inserting bursty data to achieve some average rate, so as not to exceed some peak rate or even to simply to prevent receiver buffer overflow assuming a certain (or typical) receiver buffer occupancy and pendency of data therein. Thus, even at times when the processor 160 has bursty or best effort data available for insertion into one or more vacant transport packet time slots (and no other data is available for insertion therein), the processor 160 may choose to insert bursty data into only some vacant transport packet time slots, choose to insert bursty data into alternate or spaced apart transport packet time slots or choose not to insert bursty data into any vacant transport packet time slots, so as to regulate the transmission of data to, or to prevent overflow of, an assumed receiver bursty data buffer. In addition, transport packets destined to multiple different receivers may themselves be interleaved, regardless of when they were generated, to maintain some data transmission rate to the receiver.

In any event, the remultiplexer node 100 provides a simple method for optimizing the bandwidth of TSs. All null transport packets in incoming TSs are discarded. If transport packets are available, they are inserted into the time slots that normally would have been allocated to the discarded null transport packets. If transport packets are not available, gaps are left for such time slots by the normal dispatch time assignment process. If no transport packet has a dispatch time indicating that it should be transmitted at the next available time slot of the outputted remultiplexed TS, the data link control circuit 112 automatically inserts a null transport packet into such a time slot.

The benefit of such a bandwidth optimization scheme is two-fold. First, a bandwidth gain is achieved in terms of the outputted remultiplexed TS. Bandwidth normally wasted on null transport packets is now used for transmitting information. Second, best effort or bursty data can be outputted in the TS without specifically allocating bandwidth (or by allocating much less bandwidth) therefor. For example, suppose an outputted remultiplexed TS has a bandwidth of 20 Mbits/sec. Four program bearing TSs of 5 Mbits/sec each are to be remultiplexed and outputted onto the 20 Mbits/sec remultiplexed TS. However, as much as 5% of the bandwidth of each of the four program bearing TSs may be allocated to null packets. As such, it is possible that up to 1 Mbit/sec may be (nominally) available for communicating best effort or bursty data bearing transport packets, albeit without any, or with limited, guarantees of constancy of end-to-end delay.

Re-timing Un-timed Data

As noted above, to-be-remultiplexed program data may be received via the asynchronous interface 140. This presents a problem because the interface 140, and the communication link to which it attaches, are not designed to transmit data at any specific time and tend to introduce a variable end-to-end delay into communicated data. In comparison, an assumption can be made for program data received at the remultiplexer node 100 via a synchronous communication link (such as is attached to a receiving adaptor 110) that all received transport packets thereof will be outputted without jitter. This is because all such packets incur the same delay at the remultiplexer node 100 (namely, the internal buffering delay), or, if they do not (as a result of time slot contention, as described above), the additional delay is known and the PCRs are adjusted to remove any jitter introduced by such additional delays. In addition, the PCRs are furthermore corrected for drift of the internal clock mechanism relative to the system time clock of each program and for the misalignment between scheduled output time of PCRs and actual output time relative to the slot boundaries of the outputted TS. However, in the case of transport packets received from the interface 140, the transport packets are received at the remultiplexer node 100 at a variable bit rate and at non-constant, jittered times. Thus, if the actual receipt times of the transport packet is used as a basis for estimating the departure of the transport packet, the jitter will remain. Jittered PCRs not only cause decoding and presentation discontinuities at the decoder, they cause buffer overflow and underflow. This is because the bit rate of each program is carefully regulated assuming that the data will be removed from the decoder buffer for decoding and presentation relative to the system time clock of the program.

According to an embodiment, these problems are overcome as follows. The processor 160 identifies the PCRs of each program of the received TS. Using the PCRs, the processor 160 determines the piece-wise transport packet rate of transport packets of each program between pairs of PCRs. Given the transport packet rate of each (interleaved) sequence of transport packets of each program, the processor 160 can assign estimated departure times based on the times at which each transport packet should have been received.

Illustratively, as the interlace 140 receives program data, the received program data is transferred from the interface 140 to the packet buffers 122 of the host memory 120. Specifically, the interface 140 stores received program data in some form of a receipt queue. Preferably, the received program data is in transport packets.

The interface 140 periodically interrupts the processor 160 when it receives data. The interface 140 may interrupt the processor 160 each time it receives any amount of data or may interrupt the processor 160 after receiving a certain amount of data. As with the adaptor 110, a receipt PID handler subroutine pointer table 402 is specially devised for the interface 140. The subroutines pointed to by the pointers may be similar in many ways to the subroutines pointed to by the pointers in the receipt PID handler subroutine pointer table associated with a receive adaptor 110. However, the subroutines are different in at least the following ways. First, the asynchronous interface 140 might not allocate descriptors having the format shown in FIG. 2 to received program data and might not receive program data in transport packets. For example, the program data may be PES packet data or PS pack data. In such a case, the subroutines executed by the processor 160 for PIDs of retained transport packets illustratively include a process for inserting program data into transport packets. In addition, a process may be provided for allocating a receipt descriptor of a queue assigned to the adaptor 140 to each received transport packet. The processor 160 stores in the pointer field 129-4 of each allocated descriptor a pointer to the storage location of the corresponding transport packet. Illustratively, the actual receipt time field 129-5 is initially left blank.

Each transport packet containing a PCR furthermore includes the following process. The first time a PCR bearing transport packet is received for any program, the processor 160 obtains a time stamp from the reference clock generator 113 of any adaptor 110 (or any other reference clock generator 113 that is synchronously locked to the reference clock generators 113 of the adaptors 110). As described below, the reference clocks 113 are synchronously locked. The obtained time stamp is assigned to the first ever received PCR bearing transport packet of a program as the receipt time of this transport packet. Note that other to-be-remultiplexed transport packets may have been received prior to this first received PCR bearing transport packet. The known internal buffering delay at the remultiplexer node 100 may be added to the receipt time stamp to generate an estimated departure time which is assigned to the transport packet (containing the first ever received PCR of a particular program).

After the second successive transport packet bearing a PCR for a particular program is received, the processor 160 can estimate the transport packet rate between PCRs of that program received via the asynchronous interface 140. This is achieved as follows. The processor 160 forms the difference between the two successive PCRs of the program. The processor then divides this difference by the number of transport packets of the same program between the transport packet containing the first PCR and the transport packet containing the second PCR of the program. This produces the transport packet rate for the program. The processor 160 estimates the departure time of each transport packet of a program between the PCRs of that program by multiplying the transport packet rate for the program with the offset or displacement of each such transport packet from the transport packet containing the first PCR. The offset is determined by subtracting the transport packet queue position of the transport packet bearing the first PCR from the transport packet queue position for which an estimated departure time is being calculated. (Note that the queue position of a transport packet is relative to all received transport packets of all received streams.) The processor 160 then adds the estimated departure time assigned to the transport packet containing the first PCR to the product thus produced. The processor 160 illustratively stores the estimated departure time of each such transport packet in the field 129-10 of the descriptor that points thereto.

After assigning an estimated departure time stamp to the transport packets of a program, the processor 160 may discard transport packets (according to a user specification) that will not be outputted in a TS. The above process is then continuously repeated for each successive pair of PCRs of each program carried in the TS. The data of the descriptors with the estimated departure times may then be transferred to the appropriate transmit queue(s) in the course of the processor 160 executing transmit PID handler subroutines. Note also that initially some transport packets may be received for a program prior to receiving the first PCR of that program. For these transport packets only, the transport packet rate is estimated as the transport packet rate between the first and second PCR of that program (even though these packets are not between the first and second PCR's). The estimated departure time is then determined as above.

As with PCRs received from a synchronous interface such as an adaptor 110, PCRs received via the asynchronous interface 140 are corrected for drift between each program clock and the local reference clocks 113 used to assign estimated receipt time stamps and to output transport packets. Unlike transport packets received from an adaptor 110, the transport packets received from the interface 140 do not have actual receipt time stamps recorded therefor. As such, there is no reference clock associated with each transport packet from which drift can accurately be measured. Instead, the processor 160 uses a measure of the transmit queue length or current delay therein in the remultiplexer node 100 to estimate drift. Ideally, the transmit queue length should not vary from a predetermined known delay in the remultiplexer node 100. Any variation in transmit queue length is an indication of drift of the reference clock generator(s) 113 of the adaptor(s) 110 relative to the program clocks of the programs. As such, the processor 160 adjusts a measure of drift upwards or downwards depending on the difference between the current transmit queue length and the expected, ideal transmit queue length. For example, each time a transmit descriptor is allocated to a transport packet, the processor 160 measures the current transmit queue length and subtracts it from the ideal transmit queue length in the remultiplexer node 100. The difference is the drift. The drift thus calculated is used to adjust the PCRs and estimated departure times of the transport packets that carry such PCRs. That is, the drift thus calculated is subtracted from the PCR of a transport packet received via the asynchronous interface which is placed into the later time slot than the time slot corresponding to the estimated departure time of the transport packet. Likewise, the drift may be subtracted from the estimated departure time of the PCR bearing transport packet prior to assignment of an actual dispatch time. Note that this estimated drift is only used for transport packets received from the asynchronous interface 140 and not other transport packets received via a synchronous interface such as the adaptor 110.

Now consider the problem of contention. When two (or more) received transport packets contend for assignment to the same transport packet time slot (and actual dispatch time) of the outputted remultiplexed TS, one transport packet is assigned to the time slot and the other is assigned to the next time slot. If the other transport packet contains a PCR, the PCR is adjusted by the number of time slots it is displaced from its ideal time slot to reflect the assignment to a later time slot.

Assisted Output Timing

As noted above, the interface 140 does not receive transport packets at any particular time. Likewise, the interface 140 does not transmit transport packets at any particular time. However, even though the interface 140, and the communication link to which it is attached, do not provide a constant end-to-end delay, it is desirable to reduce the variation in end-to-end delay as much as possible. The remultiplexer node 100 provides a manner for minimizing such variations.

According to an embodiment, the processor 160 allocates a transmit descriptor of a transmit queue assigned to the interface 140 for each transport packet to be outputted via the interface 140. This may be achieved using an appropriate set of transmit PID handler subroutines for the transmit queue assigned to the output port of the interface 140. The processor 160 furthermore assigns an adaptor 110 for managing the outputting of data from this interface 140. Although the transmit queue is technically "assigned" to the interface 140, the DMA control circuit 116 of the adaptor 110 assigned to managing the output from the interface 140 actually obtains control of the descriptors of the descriptor queue assigned to the interface 140. The data link control circuit 112 accesses such descriptors, as described below, which may be maintained in the cache 114. Thus, the set of transmit PID handler subroutines assigned to this queue, and executed by the processor 160, is actually triggered by an interrupt generated by the data link control circuit 112 which examines the queue.

As above, in response to the interrupt, the processor 160 examines the to-be-scheduled descriptors, i.e., in connection queues, selects one or more descriptors of these connection queues to be outputted from the output port of interface 140 and allocates transmit descriptors for the selected descriptors of the connection queues at the tail of the transmit queue associated with the output port of the interface 140. Unlike the outputting of transport packets described above, the processor 160 may also gather the transport packets associated with the selected descriptors of the connection queues and actually physically organize them into a queue-like buffer, if such buffering is necessary for the interface 140.

As above, the DMA control circuit 116 obtains control of a sequence of one or more descriptors, associated with the output port of the interface 140, following the last descriptor of which the DMA control circuit 116 obtained control. (Note that it is irrelevant whether or not the transport packets corresponding to the descriptors are retrieved. Because the data link control circuit 112 controls the outputting of transport packets at the interface 114, no transport packets are outputted from the output port connected to that data link interface 112. Alternatively, the data link control circuit 112 can operate exactly as described above, thereby producing a mirror copy of the outputted TS. In such a case, a second copy of each transport packet, accessible by the adaptor 110, must also be provided.) As above, the data link control circuit 112 retrieves each descriptor from the cache and determines, based on the indicated dispatch time recorded in field 129-5, when the corresponding transport packet is to be transmitted relative to the time indicated by the reference clock generator 113. Approximately when the time of the reference clock generator 113 equals the dispatch time, the data link control circuit 112 generates an interrupt to the processor 160 indicating that the transport packet should be transmitted now. This can be the same interrupt as generated by the data link control circuit 112 when it transmits k≧1 transport packets. However, the interrupt is preferably generated every k=1 transport packets. In response, the processor 160 examines the appropriate table of pointers to transmit PID handler subroutines and execute the correct transmit PID handler subroutine. In executing the transmit PID handle subroutine, the processor 160 issues a command or interrupt for causing the interface 140 to transmit a transport packet. This causes the very next transport packet to be transmitted from the output port of the interface 140 approximately when the current time of the reference clock generator 113 matches the dispatch time written in the descriptor corresponding to the transport packet. Note that some bus and interrupt latency will occur between the data link control circuit 112 issuing the interrupt and the interface 140 outputting the transport packet. In addition, some latency may occur on the communication link to which the interface 140 is attached (because it is busy, because of a collision, etc.) To a certain extent, an average amount of such latency can be accommodated through judicious selection of dispatch times of the transport packets by the processor 160. Nevertheless, the outputting of transport packets can be fairly close to the correct time, albeit less close than as can be achieved using the adaptor 110 or interface 150. The processor 160 furthermore transfers one or more descriptors to the transmit queue assigned to the output port of the interface 140 as described above.

Inter-Adaptor Reference Clock Locking

A particular problem in any synchronous system employing multiple clock generators is that the time or count of each generator is not exactly the same as each other clock generator. Rather, the count of each clock generator is subject to drift (e.g., as a result of manufacturing tolerance, temperature, power variations, etc.). Such a concern is also present in the environment 10. Each remultiplexer node 100, data injector 50, data extractor 60, controller 20, etc. may have a reference clock generator, such as the reference clock generator 113 of the adaptor(s) 110 in the remultiplexer node 100. It is desirable to lock the reference clock generators of at least each node 50, 60 or 100 in the same TS signal flow path so that they have the same time.

In a broadcast environment, it is useful to synchronize all equipment that generates, edits or transmits program information. In analog broadcasting, this may be achieved using a black burst generator or a SMPTE time code generator. Such synchronization enables seamless splicing of real-time video feeds and reduces noise associated with coupling asynchronous video feeds together.

In the remultiplexer node 100, the need for synchronization is even more important. This is because received transport packets are scheduled for departure based on one reference clock and actually retrieved for dispatch based on a second reference clock. It is assumed that any latency incurred by transport packets in the remultiplexer node 100 is identical. However, this assumption is only valid if there is only negligible drift between the reference clock according to which packet departure is estimated and the reference clock according to which transport packets are actually dispatched.

According to an embodiment, multiple techniques are provided for locking, i.e., synchronizing, reference clock generators 113. In each technique, the time of each "slave" reference clock generator is periodically adjusted in relation to a "master" reference clock generator.

According to a first technique, one reference clock generator 113 of one adaptor 110 is designated as a master reference clock generator. Each other reference clock generator 113 of each other adaptor 110 is designated as a slave reference clock generator. The processor 160 periodically obtains the current system time of each reference clock generator 113, including the master reference clock generator and the slave reference clock generators. Illustratively, this is achieved using a process that "sleeps" i.e., is idle for a particular period of time, wakes up and causes the processor 160 to obtain the current time of each reference clock generator 113. The processor 160 compares the current time of each slave reference clock generator 113 to the current time of the master reference clock generator 113. Based on these comparisons, the processor 160 adjust each slave reference clock generator 113 to synchronize them in relation to the master reference clock generator 113. The adjustment can be achieved simply by reloading the reference clock generators 113, adding an adjusted time value to the system time of the reference clock generator 113 or (filtering and) speeding-up or slowing-down the pulses of the voltage controlled oscillator that supplies the clock pulses to the counter of the reference clock generator 113. The last form of adjustment is analogous to a phase-locked loop feedback adjustment described in the MPEG-2 Systems specification.

Consider now the case where the master reference clock generator and the slave reference clock generator are not located in the same node, but rather are connected to each other by a communication link. For example, the master reference clock generator may be in a first remultiplexer node 100 and the slave reference clock generator may be in a second remultiplexer node 100, where the first and second remultiplexer nodes are connected to each other by a communication link extending between respective adaptors 110 of the first and second remultiplexer nodes 100. Periodically, in response to a timer process, the processor 160 issues a command for obtaining the current time of the master reference clock generator 113. The adaptor 110 responds by providing the current time to the processor 160. The processor 160 then transmits the current time to each other slave reference clock via the communication link. The slave reference clocks are then adjusted, e.g., as described above.

It should be noted that any time source or time server can be used as the master reference clock generator. The time of this master reference clock generator is transmitted via the dedicated communication link with a constant end-to-end delay to each other node containing a slave reference clock.

If two or more nodes 20, 40, 50, 60 or 100 of a remultiplexer 30 are separated by a large geographical distance, it might not be desirable to synchronize the reference clock generators of each node to the reference clock generator of any other node. This is because any signal transmitted on a communication link is subject to some finite propagation delay. Such a delay causes a latency in the transmission of transport packets, especially transport packets bearing synchronizing time stamps. Instead, it might be desirable to use a reference clock source more equally distant from each node of the remultiplexer 30. As is well known, the U.S. government maintains both terrestrial and satellite reference clock generators. These sources reliably transmit the time on well known carrier signals. Each node, such as the remultiplexer node 100, may be provided with a receiver, such as a GPS receiver 180, that is capable of receiving the broadcasted reference clock. Periodically, the processor 160 (or other circuitry) at each node 20, 40, 50, 60 or 100 obtains the reference clock from the receiver 180. The processor 160 may transfer the obtained time to the adaptor 110 for loading into the reference clock generator 113. Preferably, however, the processor 160 issues a command to the adaptor 110 for obtaining the current time of the reference clock generator 113. The processor 160 then issues a command for adjusting, e.g., speeding up or slowing down, the voltage controlled oscillator of the reference clock generator 113, based on the disparity between the time obtained from the receiver 180 and the current time of the reference clock generator 113.

Networked Remultiplexing

Given the above described operation, the various functions of remultiplexing may be distributed over a network. For example, multiple remultiplexer nodes 100 may be interconnected to each other by various communication links, the adaptor 110, and interfaces 140 and 150. Each of these remultiplexer nodes 100 may be controlled by the controller 20 (FIG. 1) to act in concert as a single remultiplexer 30.

Such a network distributed remultiplexer 30 may be desirable as a matter of convenience or flexibility. For example, one remultiplexer node 100 may be connected to multiple file servers or storage devices 40 (FIG. 1). A second remultiplexer node 100 may be connected to multiple other input sources, such as cameras, or demodulators/receivers. Other remultiplexer nodes 100 may each be connected to one or more transmitters/modulators or recorders. Alternatively, remultiplexer nodes 100 may be connected to provide redundant functionality and therefore fault tolerance in the event one remultiplexer node 100 fails or is purposely taken out of service.

Consider a first network remultiplexer 30' shown in FIG. 3. In this scenario, multiple remultiplexer nodes 100', 100", 100''' are connected to each other via an asynchronous network, such as a 100 BASE-TX Ethernet network. Each of the first two remultiplexer nodes 100', 100" receives four TSs TS10–TS13 or TS14–TS17 and produces a single remultiplexed output TS TS18 or TS19. The third remultiplexer 100''' receives the TSs TS18 and TS19 and produces the output remultiplexed TS TS20. In the example shown in FIG. 3, the remultiplexer node 100' receives real-time transmitted TSs TS10–TS13 from a demodulator/receiver via its adaptor 110 (FIG. 2). On the other hand, the remultiplexer 100" receives previously stored TSs TS14–TS17 from a storage device via a synchronous interface 150 (FIG. 2). Each of the remultiplexer nodes 100' and 100" transmits its respective outputted remultiplexed TS, i.e., TS18 or TS19, to the remultiplexer node 100''' via an asynchronous (100 BASE-TX Ethernet) interface 140 (FIG. 2) to an asynchronous (100 BASE-TX Ethernet) interface 140 (FIG. 2) of the remultiplexer node 100'''. Advantageously, each of the remultiplexer nodes 100' and 100" use the above-described assisted output timing technique to minimize the variations in the end-to-end delays caused by such communication. In any event, the remultiplexer node 100''' uses the Re-timing of un-timed data technique described above to estimate the bit rate of each program in TS18 and TS19 and to dejitter TS18 and TS19.

Optionally, a bursty device 200 may also be included on at least one communication link of the system 30'. For example, the communication medium may be shared with other terminals that perform ordinary data processing, as in a LAN. However, bursty devices 200 may also be provided for purposes of injecting and/or extracting data into the TSs, e.g., the TS20. For example, the bursty device 200 may be a server that provides internet access, a web server a web terminal, etc.

Of course, this is simply one example of a network distributed remultiplexer. Other configurations are possible. For example, the communication protocol of the network in which the nodes are connected may be ATM, DS3, etc.

Two important properties of the network distributed remultiplexer 30' should be noted. First, in the particular network shown, any input port can receive data, such as bursty data or TS data, from any output port. That is, the remultiplexer node 100' can receive data from the remultiplexer nodes 100" or 100''' or the bursty device 200, the remultiplexer node 100" can receive data from the remultiplexer nodes 100' or 100''' or the bursty device 200, the remultiplexer node 100''' can receive data from any of the remultiplexer nodes 100' or 100" or the bursty device 200 and the bursty device 200 can receive data from any of the remultiplexer nodes 100', 100" or 100'''. Second, a remultiplexer node that performs data extraction and discarding, i.e., the remultiplexer node 100''' can receive data from more than one source, namely, the remultiplexer nodes 100' or 100" or the bursty device 200, on the same communication link.

As a consequence of these two properties, the "signal flow pattern" of the transport packets from source nodes to destination nodes within the remultiplexer is independent of the network topology in which the nodes are connected. In other words, the node and communication link path traversed by transport packets in the network distributed remultiplexer 30' does not depend on the precise physical connection of the nodes by communication links. Thus, a very general network topology may be used—remultiplexer nodes 100 may be connected in a somewhat arbitrary topology (bus, ring, chain, tree, star, etc.) yet still be able to remultiplex TSs to achieve virtually any kind of node to node signal flow pattern. For example, the nodes 100', 100", 100''' and 200 are connected in a bus topology. Yet any of the following signal flow patterns for transmitted data (e.g., TSs) can be achieved: from node 100' to node 100" and then to node 100'"; from each of node 100' and 100'" in parallel to node 200; from nodes 200 and 100', in parallel to node 100" and then from node 100" to node 100'", etc. In this kind of transmission, time division multiplexing may be necessary to interleave signal flows between different sets of communicating nodes. For example, in the signal flow illustrated in FIG. 3, TS18 and TS19 are time division multiplexed on the shared communications medium.

The above discussion is intended to be merely illustrative of the invention. Those having ordinary skill in the art may devise numerous alternative embodiments without departing from the spirit and scope of the following claims.

The claimed invention is:

1. A method for descrambling transport packets of a transport stream, said transport packets containing elementary stream data of one or more video programs, said method comprising the steps of:
   (a) defining a sequence of one or more processing steps to be performed on each transport packet and ordering the step of descrambling processing within said sequence,
   (b) allocating one unique descriptor of a queue for each transport packet, each allocated descriptor containing a pointer to a memory location for storing said transport packet for which said descriptor is allocated, one or more processing indications and a control word information field,
   (c) storing control word information associated with contents of said transport packet in said control word information field of selected ones of said allocated descriptors,
   (d) setting said one or more of said processing indications to indicate that the next step of processing of said sequence may be performed on each of said allocated descriptors,
   (e) sequentially accessing each allocated descriptor, and
   (f) for each accessed descriptor pointing to a memory location for storing a to-be-descrambled transport packet, descrambling said transport packet stored in said memory location pointed to by said accessed descriptor using said control word information in said accessed descriptor, only if said one or more processing indications of said accessed descriptor are set to indicate that descrambling processing may be performed on said accessed descriptor and transport packet stored in said memory location to which said accessed descriptor points.

2. The method of claim 1 wherein said control word information is a base address of a control word table.

3. The method of claim 2 further comprising the steps of:
   (g) during said step of descrambling, locating a control word table using said base address and retrieving a control word from an entry of said control word table indexed by a packet identifier of said transport packet, each packet identifier uniquely indicating the elementary stream data contained in said transport packet.

4. The method of claim 3 wherein said step of locating further comprises using an odd/even control word indication of said transport packet for retrieving said control word.

5. The method of claim 3 further comprising the steps of:
   (g) maintaining a control word table containing said control words for descrambling contents of said transport packets.

6. The method of claim 1 further comprising the steps of:
   (g) writing descrambled transport packet data into a transport packet storage location pointed to by said pointer of said allocated descriptor, thereby overwriting pre-descrambling data of said transport packet, and
   (h) after examining each descriptor containing processing indications that indicate that descrambling processing may be performed, setting one or more of said processing indications to indicate that the next step of processing of said sequence may be performed on said descriptor, and transport packet to which said descriptor points.

7. A method for scrambling transport packets of a transport stream, said transport packets containing elementary stream data of one or more video programs, said method comprising the steps of:
   (a) defining a sequence of one or more steps to be performed on each transport packet and ordering scrambling processing within said sequence,
   (b) allocating a unique descriptor of a queue for each transport packet, each allocated descriptor containing a pointer to a memory location for storing said transport packet for which said descriptor is allocated, one or more processing indications and a control word information field,
   (c) storing control word information associated with contents of said transport packet in said control word information field of selected ones of said allocated descriptors,
   (d) setting said one or more of said processing indications to indicate that the next step of processing of said sequence may be performed on each of said allocated descriptors,
   (e) sequentially accessing each allocated descriptor, and
   (f) for each accessed descriptor pointing to a memory location storing a to-be-scrambled transport packet, scrambling said transport packet stored in said memory location pointed to by said accessed descriptor using said control word information in said accessed descriptor, only if said one or more processing indications of said accessed descriptor are set to indicate that scrambling processing may be performed on said accessed descriptor and transport packet stored in said memory location to which said accessed descriptor points.

8. The method of claim 7 wherein said control word information is a control word corresponding to contents of each transport packet.

9. The method of claim 8 further comprising the steps of:
   (g) during said step of allocating, retrieving said control word from an entry of a control word table indexed by a packet identifier of said transport packet, each packet identifier uniquely indicating the elementary stream data contained in said transport packet, and
   (h) storing said retrieved control word in said control word storage location of said descriptor.

10. The method of claim 9 further comprising the steps of:
    (i) maintaining a control word table containing said control words for scrambling contents of said transport packets.

11. The method of claim 7 further comprising, for each of one or more descriptors allocated for a to-be-scrambled transport packet, the steps of:
    (g) writing scrambled transport packet data into said memory location pointed to by said pointer of said allocated descriptor, thereby overwriting pre-scrambled data of said transport packet, and
    (h) after examining said descriptor containing one or more processing indications that indicate that scrambling processing may be performed, setting one or more of said processing indications to indicate that the next step of processing of said sequence may be performed on said descriptor, and transport packet stored in said memory location to which said descriptor points.

12. A remultiplexer for descrambling transport packets of a transport stream, said transport packets containing elementary stream data of one or more video programs, said remultiplexer comprising:
- a processor for defining a sequence of one or more processing steps to be performed on each transport packet and for ordering descrambling processing within said sequence,
- a data link control circuit for allocating one unique descriptor of a queue for each transport packet, each allocated descriptor containing a pointer to a memory location for storing said transport packet for which said descriptor is allocated, one or more processing indications and a control word information field, and for setting said one or more of said processing indications to indicate that the next step of processing of said sequence may be performed on each of said allocated descriptors, and
- a descrambler for sequentially accessing each allocated descriptor, and, for each accessed descriptor pointing to a memory location storing a to-be-descrambled transport packet, descrambling said transport packet pointed to by said accessed descriptor using control word information in said accessed descriptor, only if said one or more processing indications of said accessed descriptor are set to indicate that descrambling processing may be performed on said accessed descriptor and transport packet stored in said memory location to which said accessed descriptor points,
- wherein said processor also stores control word information associated with the contents of received transport packets in said control word information fields of corresponding ones of said descriptors.

13. The remultiplexer of claim 12 wherein said control word information is a base address of a control word table.

14. The remultiplexer of claim 13 wherein said descrambler locates a control word table using said base address and retrieves a control word from an entry of said control word table indexed by a packet identifier of said transport packet, each packet identifier uniquely indicating the elementary stream data contained in said transport packet.

15. The remultiplexer of claim 14 wherein said descrambler locates said control word using an odd/even indicator of said transport packet to index said control word table.

16. The remultiplexer of claim 14 wherein said processor maintains a control word table containing said control words for descrambling contents of said transport packets.

17. The remultiplexer of claim 12 wherein, for each of one or more descriptors allocated for a to-be-descrambled transport packet, said descrambler writes descrambled transport packet data into said memory location pointed to by said pointer of said allocated descriptor, thereby overwriting pre-descrambling data of said transport packet, and, after examining said descriptor containing processing indications that indicate that descrambling processing may be performed, sets one or more of said processing indications to indicate that the next step of processing of said sequence may be performed on said descriptor and transport packet stored in said memory location to which said descriptor points.

18. A remultiplexer for scrambling transport packets of a transport stream, said transport packets containing elementary stream data of one or more video programs, said remultiplexer comprising:
- a processor for defining a sequence of one or more processing steps to be performed on each transport packet, for ordering scrambling processing within said sequence, for allocating a unique descriptor of a queue for each transport packet, each allocated descriptor containing a pointer to a memory location for storing said transport packet for which said descriptor is allocated, one or more processing indications and a control word information field, storing control word information associated with contents of said transport packet in said control word information field of selected ones of said allocated descriptors, and for setting one or more of said processing indications to indicate that the next step of processing of said sequence may be performed on each of said allocated descriptors, and
- a scrambler for sequentially accessing each allocated descriptor, and, for each accessed descriptor pointing to a memory location storing a to-be-scrambled transport packet, scrambling said transport packet stored in said memory location pointed to by said accessed descriptor using said control word information in said accessed descriptor, only if said one or more processing indications of said accessed descriptor are set to indicate that scrambling processing may be performed on said accessed descriptor and transport packet stored in said memory location to which said accessed descriptor points.

19. The remultiplexer of claim 18 wherein said control word information is a control word corresponding to contents of each transport packet.

20. The remultiplexer of claim 19 wherein said processor retrieves said control word from an entry of a control word table indexed by a packet identifier of said transport packet, each packet identifier uniquely indicating the elementary stream data contained in said transport packet, and stores said retrieved control word in said control word storage location of said descriptor.

21. The remultiplexer of claim 20 wherein said processor maintains a control word table containing said control words for scrambling contents of said transport packets.

22. The remultiplexer of claim 18 wherein, for each of one or more descriptors allocated for a to-be-scrambled transport packet, said scrambler writes scrambled transport packet data into said memory location pointed to by said pointer of said allocated descriptor, thereby overwriting pre-scrambled data of said transport packet, and, after examining said descriptor containing one or more processing indications that indicate that scrambling processing may be performed, sets one or more of said processing indications to indicate that the next step of processing of said sequence may be performed on said descriptor and transport packet stored in said memory location to which said descriptor points.

23. A transport stream containing descrambled transport packets, said transport packets containing elementary stream data of one or more video programs, said transport stream being produced by the steps of:
- (a) defining a sequence of one or more processing steps to be performed on each transport packet and ordering descrambling processing within said sequence,
- (b) allocating a unique descriptor of a queue for each transport packet, each allocated descriptor containing a pointer to a memory location for storing said transport packet for which said descriptor is allocated, one or more processing indications and a control word information field, (c) storing control word information associated with contents of said transport packet in said control word information field of selected ones of said allocated descriptors, (d) setting one or more of said processing indications to indicate that the next step of processing of said sequence may be performed on each of said allocated descriptors, (e) sequentially accessing each allocated descriptor, and (f) for each accessed descriptor pointing to a memory location storing a to-be-descrambled transport packet, descrambling said transport packet stored in said memory location pointed to by said accessed descriptor using said control word information in said accessed descriptor, only if said one or more processing indications of said accessed descriptor are set to indicate that descrambling processing may be performed on said accessed descriptor and transport packet stored in said memory location to which said accessed descriptor points.

24. A transport stream containing scrambled transport packets, said transport packets containing elementary stream data of one or more video programs, said transport stream being produced by the steps of:

(a) defining a sequence of one or more processing steps to be performed on each transport packet and ordering scrambling processing within said sequence, (b) allocating a unique descriptor of a queue for each transport packet, each allocated descriptor containing a pointer to a memory location for storing said transport packet for which said descriptor is allocated, one or more processing indications and a control word information field, (c) storing control word information associated with contents of said transport packet in said control word information field of selected ones of said allocated descriptors, (d) setting one or more of said processing indications to indicate that the next step of processing of said sequence may be performed on each of said allocated descriptors, (e) sequentially accessing each allocated descriptor, and (f) for each accessed descriptor pointing to a memory location storing a to-be-scrambled transport packet, scrambling said transport packet stored in said memory location pointed to by said accessed descriptor using said control word information in said accessed descriptor, only if said one or more processing indications of said accessed descriptor are set to indicate that scrambling processing may be performed on said accessed descriptor and transport packet stored in said memory location to which said accessed descriptor points.

25. A method for descrambling transport packets of a transport stream, said transport packets containing elementary stream data of one or more video programs, said method comprising the steps of:

(a) defining a sequence of one or more processing steps to be performed on each transport packet and ordering the step of descrambling processing within said sequence, (b) allocating one unique descriptor of a queue for each transport packet, each allocated descriptor containing a pointer to a memory location for storing said transport packet for which said descriptor is allocated, and a control word information field, (c) storing control word information associated with contents of said transport packet in said control word information field of selected ones of said allocated descriptors, (d) sequentially accessing each allocated descriptor, and (e) for each accessed descriptor pointing to a memory location for storing a to-be-descrambled transport packet, descrambling said transport packet stored in said memory location pointed to by said accessed descriptor using said control word information in said accessed descriptor.

26. The method of claim 25 wherein said control word information is a base address of a control word table.

27. The method of claim 26 further comprising the steps of:

(f) during said step of descrambling, locating a control word table using said base address and retrieving a control word from an entry of said control word table indexed by a packet identifier of said transport packet, each packet identifier uniquely indicating the elementary stream data contained in said transport packet.

28. The method of claim 27 wherein said step of locating further comprises using an odd/even control word indication of said transport packet for retrieving said control word.

29. The method of claim 27 further comprising the steps of:

(f) maintaining a control word table containing said control words for descrambling contents of said transport packets.

30. The method of claim 25 further comprising, for each of one or more descriptors allocated for a to-be-descrambled transport packet, the steps of:

(f) writing descrambled transport packet data into said memory location pointed to by said pointer of said allocated descriptor, thereby overwriting pre-descrambling data of said transport packet, and (g) performing any processing steps subsequent to said descrambling processing step on said descrambled transport packet stored in said memory location pointed to by said allocated descriptor.

31. A method for scrambling transport packets of a transport stream, said transport packets containing elementary stream data of one or more video programs, said method comprising the steps of:

(a) defining a sequence of one or more steps to be performed on each transport packet and ordering scrambling processing within said sequence, (b) allocating a unique descriptor of a queue for each transport packet, each allocated descriptor containing a pointer to a memory location for storing said transport packet for which said descriptor is allocated and a control word information field, (c) storing control word information associated with contents of said transport packet in said control word information field of selected ones of said allocated descriptors, (d) sequentially accessing each allocated descriptor, and (e) for each accessed descriptor pointing to a memory location storing a to-be-scrambled transport packet, scrambling said transport packet stored in said memory location pointed to by said accessed descriptor using said control word information in said accessed descriptor.

32. The method of claim 31 wherein said control word information is a control word corresponding to contents of each transport packet.

33. The method of claim 32 further comprising the steps of:

(f) during said step of allocating, retrieving said control word from an entry of a control word table indexed by a packet identifier of said transport packet, each packet identifier uniquely indicating the elementary stream data contained in said transport packet, and (g) storing said retrieved control word in said control word storage location of said descriptor.

34. The method of claim 33 further comprising the steps of:

(h) maintaining a control word table containing said control words for scrambling contents of said transport packets.

35. The method of claim 31 further comprising, for each of one or more descriptors allocated for a to-be-scrambled transport packet, the steps of:

(f) writing scrambled transport packet data into said memory location pointed to by said pointer of said allocated descriptor, thereby overwriting pre-scrambled data of said transport packet, and (g) performing any processing steps subsequent to the scrambling processing step on said scrambled transport packet stored in said memory location pointed to by said pointer of said allocated descriptor.

36. A remultiplexer for descrambling transport packets of a transport stream, said transport packets containing elementary stream data of one or more video programs, said remultiplexer comprising:

a processor for defining a sequence of one or more processing steps to be performed on each transport packet and for ordering descrambling processing within said sequence, a data link control circuit for allocating one unique descriptor of a queue for each transport packet, each allocated descriptor containing a pointer to a memory location for storing said transport packet for which said descriptor is allocated and a control word information field, and a descrambler for sequentially accessing each allocated descriptor, and, for each accessed descriptor pointing to a memory location storing a to-be-descrambled transport packet, descrambling said transport packet pointed to by said accessed descriptor using control word information in said accessed descriptor, wherein said processor also stores control word information associated with the contents of received transport packets in said control word information fields of corresponding ones of said descriptors.

37. The remultiplexer of claim 36 wherein said control word information is a base address of a control word table.

38. The remultiplexer of claim 37 wherein said descrambler locates a control word table using said base address and retrieves a control word from an entry of said control word table indexed by a packet identifier of said transport packet, each packet identifier uniquely indicating the elementary stream data contained in said transport packet.

39. The remultiplexer of claim 38 wherein said descrambler locates said control word using an odd/even indicator of said transport packet to index said control word table.

40. The remultiplexer of claim 38 wherein said processor maintains a control word table containing said control words for descrambling contents of said transport packets.

41. The remultiplexer of claim 36 wherein, for each of one or more descriptors allocated for a to-be-descrambled transport packet, said descrambler writes descrambled transport packet data into said memory location pointed to by said pointer of said allocated descriptor, thereby overwriting pre-descrambling data of said transport packet, and, wherein any processing steps subsequent to said descrambling processing step are performed on said descrambled transport packet stored in said memory location pointed to by said allocated descriptor.

42. A remultiplexer for scrambling transport packets of a transport stream, said transport packets containing elementary stream data of one or more video programs, said remultiplexer comprising:

a processor for defining a sequence of one or more processing steps to be performed on each transport packet, for ordering scrambling processing within said sequence, for allocating a unique descriptor of a queue for each transport packet, each allocated descriptor containing a pointer to a memory location for storing said transport packet for which said descriptor is allocated and a control word information field, and for storing control word information associated with contents of said transport packet in said control word information field of selected ones of said allocated descriptors, and a scrambler for sequentially accessing each allocated descriptor, and, for each accessed descriptor pointing to a memory location storing a to-be-scrambled transport packet, scrambling said transport packet stored in said memory location pointed to by said accessed descriptor using said control word information in said accessed descriptor.

43. The remultiplexer of claim 42 wherein said control word information is a control word corresponding to contents of each transport packet.

44. The remultiplexer of claim 43 wherein said processor retrieves said control word from an entry of a control word table indexed by a packet identifier of said transport packet, each packet identifier uniquely indicating the elementary stream data contained in said transport packet, and stores said retrieved control word in said control word storage location of said descriptor.

45. The remultiplexer of claim 44 wherein said processor maintains a control word table containing said control words for scrambling contents of said transport packets.

46. The remultiplexer of claim 42 wherein, for each of one or more descriptors allocated for a to-be-scrambled transport packet, said scrambler writes scrambled transport packet data into said memory location pointed to by said pointer of said allocated descriptor, thereby overwriting pre-scrambled data of said transport packet, wherein any processing steps subsequent to the scrambling processing step are performed on said scrambled transport packet stored in said memory location pointed to by said pointer of said allocated descriptor.

47. A transport stream containing descrambled transport packets, said transport packets containing elementary stream data of one or more video programs, said transport stream being produced by the steps of:

(a) defining a sequence of one or more processing steps to be performed on each transport packet and ordering descrambling processing within said sequence, (b) allocating a unique descriptor of a queue for each transport packet, each allocated descriptor containing a pointer to a memory location for storing said transport packet for which said descriptor is allocateds and a control word information field, (c) storing control word information associated with contents of said transport packet in said control word information field of selected ones of said allocated descriptors, (d) sequentially accessing each allocated descriptor, and (e) for each accessed descriptor pointing to a memory location storing a to-be-descrambled transport packet, descrambling said transport packet stored in said memory location pointed to by said accessed descriptor using said control word information in said accessed descriptor.

48. A transport stream containing scrambled transport packets, said transport packets containing elementary stream data of one or more video programs, said transport stream being produced by the steps of:

(a) defining a sequence of one or more processing steps to be performed on each transport packet and ordering scrambling processing within said sequence, (b) allocating a unique descriptor of a queue for each transport packet, each allocated descriptor containing a pointer to a memory location for storing said transport packet for which said descriptor is allocated and a control word information field, (c) storing control word information associated with contents of said transport packet in said control word information field of selected ones of said allocated descriptors, (d) sequentially accessing each allocated descriptor, and (e) for each accessed descriptor pointing to a memory location storing a to-be-scrambled transport packet, scrambling said transport packet stored in said memory location pointed to by said accessed descriptor using said control word information in said accessed descriptor.

\* \* \* \* \*